(12) United States Patent
Kulkarni et al.

(10) Patent No.: US 11,498,662 B2
(45) Date of Patent: Nov. 15, 2022

(54) ELECTRICALLY OPERATED LANDING GEAR LOCK SYSTEM

(71) Applicant: Goodrich Corporation, Charlotte, NC (US)

(72) Inventors: Sagar Kulkarni, Bengaluru (IN); Vishwanath Vasudeva, Bengaluru (IN); Bharath Marappan, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 365 days.

(21) Appl. No.: 16/701,657

(22) Filed: Dec. 3, 2019

(65) Prior Publication Data

US 2021/0107632 A1   Apr. 15, 2021

(30) Foreign Application Priority Data

Oct. 9, 2019   (IN) .............................. 201941040815

(51) Int. Cl.
  *B64C 25/26*    (2006.01)
  *B64C 25/20*    (2006.01)
  *B64C 25/24*    (2006.01)

(52) U.S. Cl.
  CPC .............. *B64C 25/26* (2013.01); *B64C 25/20* (2013.01); *B64C 25/24* (2013.01)

(58) Field of Classification Search
  CPC ......... B64C 25/26; B64C 25/20; B64C 25/24; E05B 5/00; E05B 15/102; E05B 47/023
  See application file for complete search history.

(56) References Cited

U.S. PATENT DOCUMENTS

| 2,668,030 | A  |   | 2/1954  | Smith et al. |
|---|---|---|---|---|
| 5,288,037 | A  | * | 2/1994  | Derrien ............... E05B 47/0607 294/82.3 |
| 6,168,113 | B1 | * | 1/2001  | Hann ..................... B64C 25/26 292/249 |
| 6,802,476 | B2 |   | 10/2004 | Bugatti |
| 6,811,118 | B2 | * | 11/2004 | Collet .................... B64C 25/26 292/216 |
| 7,883,125 | B2 |   | 2/2011  | Smith, III |
| 8,814,094 | B2 |   | 8/2014  | Tran |
| 2003/0025339 | A1 |   | 2/2003 | Vitry et al. |
| 2003/0164422 | A1 |   | 9/2003 | Collet et al. |
| 2005/0067840 | A1 |   | 3/2005 | Koveal et al. |

(Continued)

FOREIGN PATENT DOCUMENTS

| DE | 102016007362 | 12/2017 |
|---|---|---|
| EP | 265197 | 4/1988 |

(Continued)

OTHER PUBLICATIONS

European Patent Office; Extended European Search Report dated Jul. 13, 2020 in Application No. 192155653.7.

*Primary Examiner* — Medhat Badawi
*Assistant Examiner* — Vicente Rodriguez
(74) *Attorney, Agent, or Firm* — Snell & Wilmer L.L.P.

(57) ABSTRACT

A lock system for a landing gear assembly may comprise a housing and a hook configured to rotate relative to the housing. A lock pin may be configured to translate into a rotational path of the hook. An electromechanical actuator may be configured to translate the lock pin.

17 Claims, 18 Drawing Sheets

(56) References Cited

U.S. PATENT DOCUMENTS

| | | | | |
|---|---|---|---|---|
| 2006/0208501 A1* | 9/2006 | Harvey | ............... | B64C 25/26 |
| | | | | 292/201 |
| 2009/0187293 A1* | 7/2009 | Trotter | ............... | B64C 25/26 |
| | | | | 701/16 |
| 2009/0284025 A1* | 11/2009 | Salcombe | ........... | E05B 47/0607 |
| | | | | 292/201 |
| 2017/0101172 A1* | 4/2017 | Walke | ................ | F16H 25/14 |
| 2020/0377224 A1* | 12/2020 | Brighton | ............ | B64D 45/0005 |

FOREIGN PATENT DOCUMENTS

| | | |
|---|---|---|
| GB | 1321834 | 7/1973 |
| GB | 2408066 | 5/2005 |

* cited by examiner

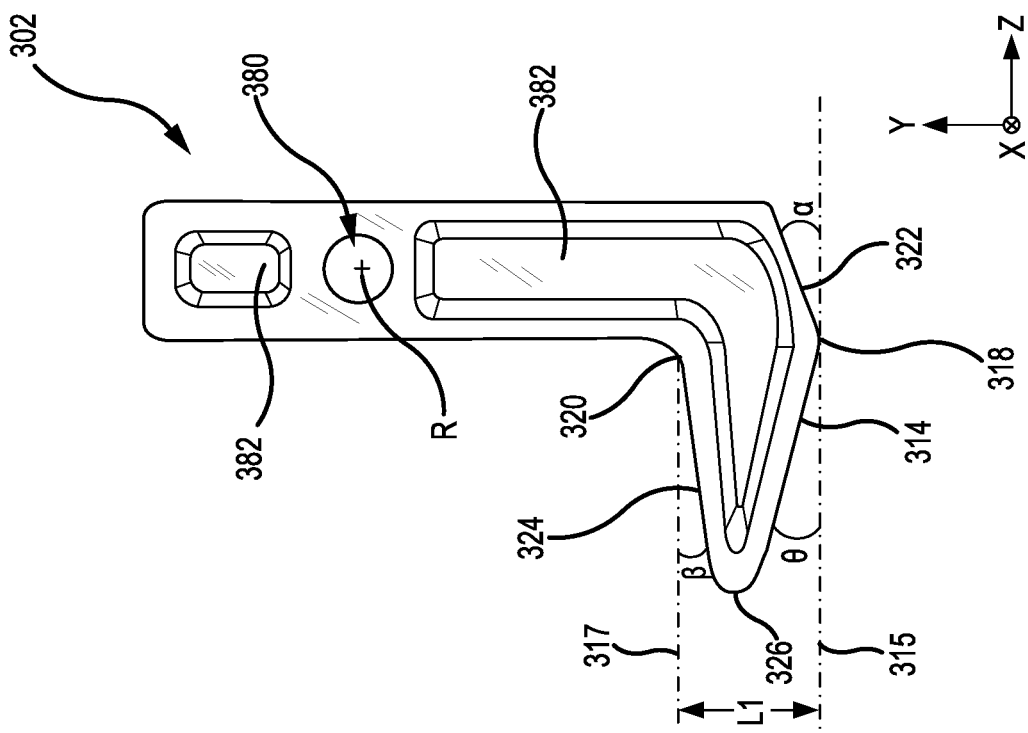
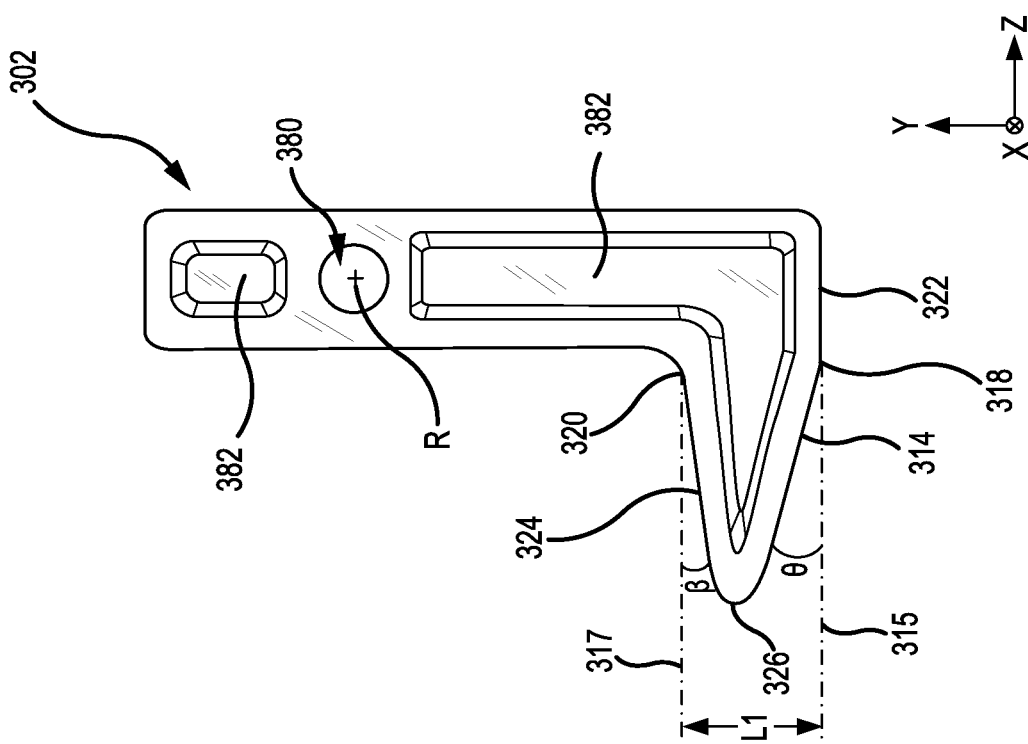
FIG. 13A
FIG. 13B

ELECTRICALLY OPERATED LANDING GEAR LOCK SYSTEM

CROSS REFERENCE TO RELATED APPLICATIONS

This application claims priority to and the benefit of, India Patent Application No. 201941040815 filed on Oct. 9, 2019 and entitled "ELECTRICALLY OPERATED LANDING GEAR LOCK SYSTEM," which is hereby incorporated by reference in its entirety.

FIELD

The present disclosure relates to landing gear, and more particularly, to an electrically operated landing gear lock system.

BACKGROUND

Aircrafts generally include landing gear that supports the aircraft during taxi, take-off, and landing. After take-off, the landing gear may be translated to a "landing gear up" position, wherein the landing gear translates into a wheel well defined by, for example, a wing or a fuselage of the aircraft. A lock assembly may be employed to maintain the landing gear within the wheel well (i.e., in the "landing gear up" position). Current lock assemblies tend to employ hydraulic actuators, which may increase the weight of the lock system and/or the noise associated with locking and unlocking the system. Hydraulic actuators may also be susceptible to hydraulic fluid leakage.

SUMMARY

A lock system for a landing gear assembly is disclosed herein. In accordance with various embodiments, the lock system may comprise a housing and a hook configured to rotate relative to the housing. A lock pin may be configured to translate into a rotational path of the hook. An electromechanical actuator may be configured to translate the lock pin.

In various embodiments, a radially outward surface of the hook may be oriented at a first angle greater than 0° and less than 90° relative to a first horizontal plane. The first horizontal plane may be coplanar with a radially outward most point of the radially outward surface of the hook and parallel to an axis of rotation of the hook. A radially inward surface of the hook may be oriented at a second angle greater than 0° and less than 90° relative to a second horizontal plane. The second horizontal plane may be coplanar with a radially inward most point of the radially inward surface of the hook and parallel to the axis of rotation of the hook.

In various embodiments, the hook may further comprise a relief surface extending from the radially outward most point of the radially outward surface of the hook. The relief surface may be oriented at an angle of 0° to 45° relative to the first horizontal plane.

In various embodiments, a manual release assembly may be configured to translate the lock pin away from the hook. The manual release assembly may comprise a release bracket configured to slide relative to the housing and a bracket biasing member configured to bias the release bracket toward the hook. The manual release assembly may further comprise a pop-up pin, a pop-up strip, a cord, and a strip biasing member. The pop-up pin may include a head and a pin shaft extending from the head. The head may be located over a first surface of the housing and an end of the pin shaft may extend from a second surface of the housing opposite the first surface. The pop-up strip may be located over the first surface. The cord may be coupled to a first end of the pop-up strip and configured to translate a slanted surface of the pop-up strip toward the pop-up pin. The strip biasing member may be configured to bias a second end of the pop-up strip away from the pop-up pin.

In various embodiments, a first portion of the cord may be coupled to the pop-up strip and a second portion of the cord may be coupled to the release bracket. In various embodiments, the first portion and the second portion may be connected at a connection point. A first difference between a first length of first portion and a first distance between the connection point and the first end of the pop-up strip may be less than a second difference between a second length of second portion and a second distance between the connection point and the release bracket.

In various embodiments, a centering rod may be located through the hook. A first hook biasing member may be located around the centering rod and configured to bias the hook in a first direction. A second hook biasing member may be located around the centering rod and configured to bias the hook in a second direction opposite the first direction. In various embodiments, a proximity sensor may be configured to detect a position of the lock pin.

A landing gear assembly is also disclosed herein. In accordance with various embodiments, the landing gear assembly may comprise a landing gear configured to rotate about a pivot joint and a lock system configured to engage the landing gear. The lock system may comprise a housing, a hook, a lock pin, and an electromechanical actuator. The hook may be configured to rotate relative to the housing. The lock pin may be configured to translate into a rotational path of the hook. The electromechanical actuator may be configured to translate the lock pin.

In various embodiments, the lock system may further comprise a first proximity sensor configured to detect a position of the lock pin, a second proximity sensor configured to detect a position of the hook, and a controller configured to determine a position of the lock pin based a first signal output from the first proximity sensor and a position of the hook based on a second signal output from the second proximity sensor.

In various embodiments, the lock system may further comprise a manual release assembly configured to translate the lock pin away from the hook. In various embodiments, the manual release assembly may comprise a release bracket configured to translate relative to the housing and a bracket biasing member configured to bias the release bracket toward the hook.

In various embodiments, the manual release assembly may further comprise a pop-up pin, a pop-up strip, a cord and a strip biasing member. The pop-up pin may include a head and a pin shaft extending from the head. The head may be located over a first surface of the housing and an end of the pin shaft may extend from a second surface of the housing opposite the first surface. The pop-up strip may be located over the first surface. The cord may be coupled to a first end of the pop-up strip and configured to translate a slanted surface of the pop-up strip toward the pop-up pin. The strip biasing member may be configured to bias a second end of the pop-up strip away from the pop-up pin.

In various embodiments, a first portion of the cord may be coupled to the pop-up strip and a second portion of the cord may be coupled to the release bracket. In various embodiments, the cord may be configured to translate the pop-up pin prior to translating the release bracket.

In various embodiments, the lock system may further comprise a centering rod located through the hook, a first hook biasing member configured to bias the hook in a first direction, and a second hook biasing member configured to bias the hook in a second direction opposite the first direction.

A lock system is also disclosed herein. In accordance with various embodiments, the lock system may comprise a housing and a hook configured to rotate relative to the housing. A lock pin may be configured to translate into a rotational path of the hook. An actuator may be configured to translate the lock pin. A manual release assembly may be configured to translate the lock pin away from the hook.

In various embodiments, the manual release assembly may comprise a release bracket configured to slide relative to the housing, a bracket biasing member configured to bias the release bracket toward the hook, and a pop-up pin including a head and a pin shaft extending from the head. The head may be located over a first surface of the housing and an end of the pin shaft extends from a second surface of the housing opposite the first surface. The manual release assembly may further comprise a pop-up strip located over the first surface, a cord coupled to a first end of the pop-up strip and configured to translate a slanted surface of the pop-up strip toward the pop-up pin, and a strip biasing member configured to bias a second end of the pop-up strip away from the pop-up pin.

In various embodiments, a centering rod may be located through the hook. A first hook biasing member configured to bias the hook in a first direction. A second hook biasing member may be configured to bias the hook in a second direction opposite the first direction.

In various embodiments, a first sensor may be configured to detect a position of the lock pin. A second sensor may be configured to detect a position of the hook. A controller may be configured to determine a position of the lock pin based a first signal output from the first sensor and a position of the hook based on a second signal output from the second sensor.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIGS. 13A and 13B illustrate a hook for a landing gear lock system, in accordance with various embodiments.

Figure 1:
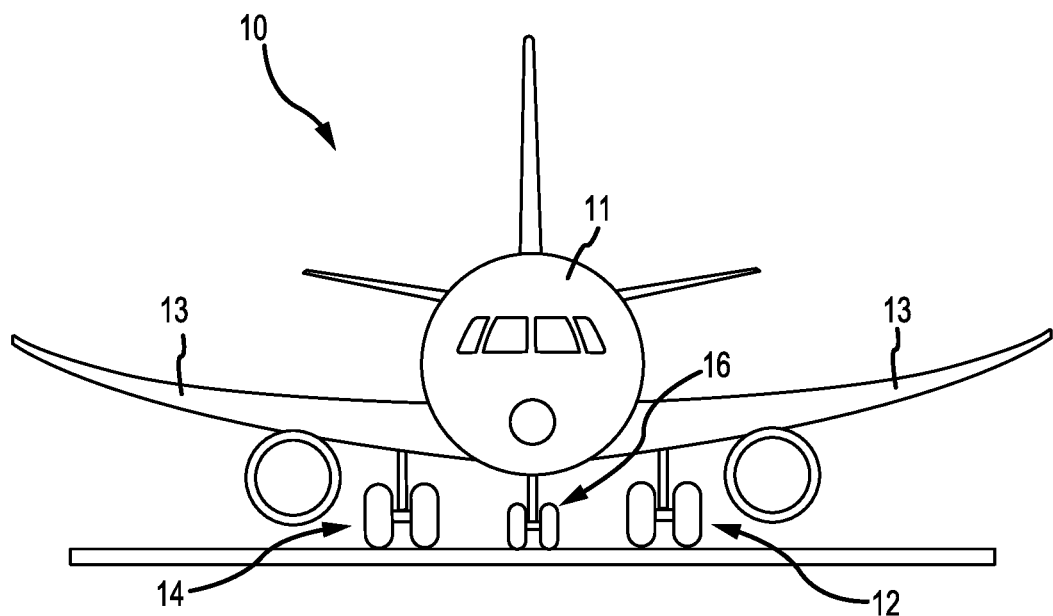
FIG. 1 illustrates an aircraft with landing gear in a landing gear down position, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Surface shading and/or cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily repeated herein for the sake of clarity.

A first component that is "radially outward" of a second component means that the first component is positioned a greater distance away from a common axis of the first and second components as compared to the second component. A first component that is "radially inward" of a second component means that the first component is positioned closer to a common axis of the first and second components than the second component. As used herein, "distal" refers to a direction outward, or generally, away from a reference component. As used herein, "proximate" refers to a direction toward, or generally, closer to the reference component.

With reference to FIG. 1, an aircraft 10 is illustrated, in accordance with various embodiments. Aircraft 10 may include a fuselage 11 and wings 13. Aircraft 10 may further include landing gear such as landing gear assembly 12, landing gear assembly 14, and landing gear assembly 16. Landing gear assembly 12, landing gear assembly 14, and landing gear assembly 16 may generally support aircraft 10, when aircraft is not flying, allowing aircraft 10 to taxi, take off, and land without damage.

Landing gear assemblies 12, 14, 16 may each include various shock and strut assemblies with one or more wheels attached thereto. Landing gear assemblies 12, 14, 16 may each be configured to translate between a landing gear down position, wherein the landing gear extend from wings 13 and/or from fuselage 11 to support aircraft 10, and a landing gear up position, wherein the landing gear are located within wings 13 and/or fuselage 11 of aircraft 10. For example, during taxiing, take-off, and landing, landing gear assemblies 12, 14, 16 may be in the landing gear down position. After take-off, landing gear assemblies 12, 14, 16 may be translated to the landing gear up position. Prior to landing, landing gear assemblies 12, 14, 16 may be translated to the landing gear down position to support aircraft 10 during landing.

It may be desirable to secure landing gear assemblies 12, 14, 16 in the up position during flight. In this regard, a landing gear lock system, as disclosed herein, is configured to maintain each of landing gear assemblies 12, 14, 16 in the landing gear up position. In accordance with various embodiments, the landing gear lock system may include a rotating hook configured engage the landing gear in the up position. The lock system may include an electromechanical actuator configured to linearly translate a lock pin configured to restrict rotation of the hook, thereby locking the landing gear in the landing gear up position. In various embodiments, the lock system may include a manual release assembly configured to translate the lock pin, and providing a redundancy should the electromechanical actuator malfunction.

Figure 2A:
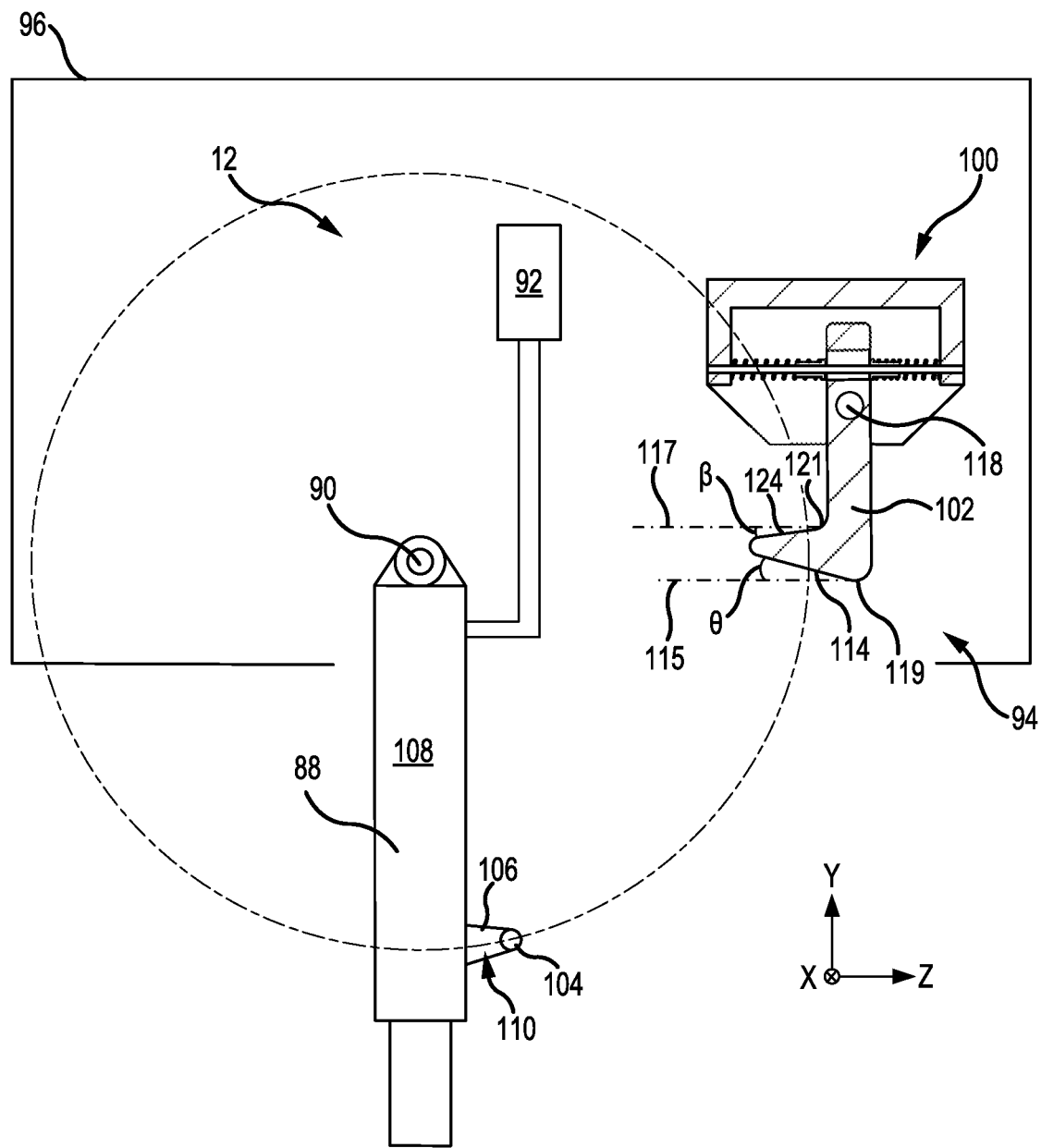
FIG. 2A illustrates a landing gear in the landing gear down position with a landing gear lock system in an unlocked state, in accordance with various embodiments.

With reference to FIG. 2A, landing gear assembly 12 is illustrated in the landing gear down position. In accordance with various embodiments, landing gear assembly 12 includes a landing gear 88 configured to rotate about a pivot joint 90. A retract actuator 92 is operationally coupled to landing gear 88. Retract actuator 92 is configured to rotate landing gear 88 about pivot joint 90. Retract actuator 92 is configured to rotate landing gear 88 between the landing gear up and landing gear down positions. Landing gear 88 may be configured to retract into a wheel well 94. In this regard, in the landing gear up position (FIG. 2C), landing gear 88 may be located within wheel well 94. Wheel well 94 is defined by an aircraft structure 96. Aircraft structure 96 may be, for example, a portion of wing 13 or fuselage 11 in FIG. 1.

Figure 2B:
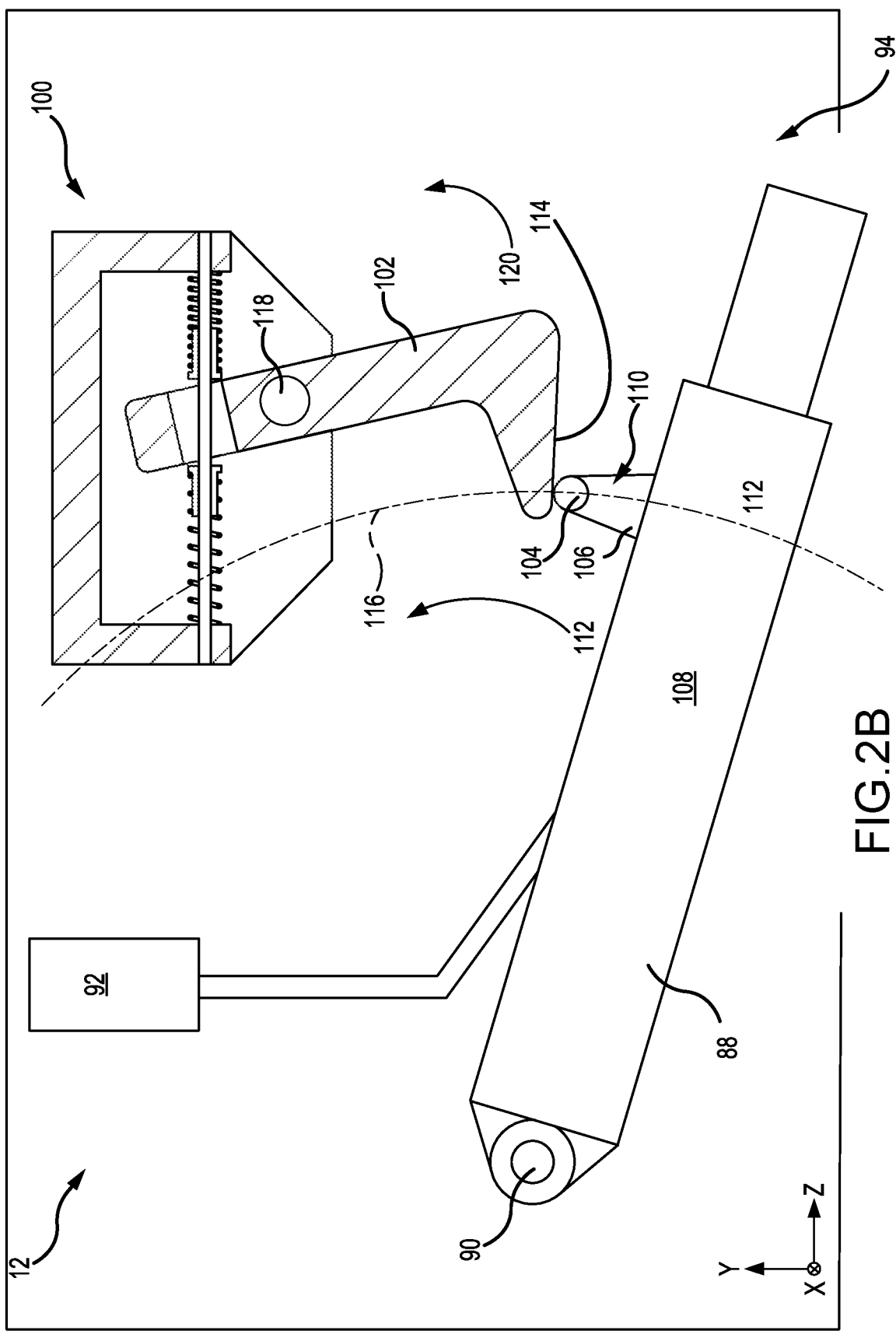
FIG. 2B illustrates a landing gear rotating towards a landing gear up position with a landing gear lock system in an unlocked state, in accordance with various embodiments.

A lock system 100 of landing gear assembly 12 may be located within wheel well 94. FIGS. 2A, 2B, and 2D illustrate a cross-section view of lock system taken along the line 2A-2A in FIG. 3A. Lock system 100 is configured to engage and maintain landing gear 88 in the landing gear up position. In various embodiments, landing gear 88 includes an uplock roller 104. Uplock roller 104 may extend between a pair of lugs 106. Uplock roller 104 may be configured to rotate, or spin, relative to lugs 106. Uplock roller 104 is spaced apart from a strut cylinder 108 of landing gear 88. Uplock roller 104, lugs 106, and strut cylinder 108 define a volume 110 configured to receive a hook 102 of lock system 100.

With reference to FIG. 2B, as landing gear 88 rotates to the landing gear up position, retract actuator 92 causes landing gear 88 to rotate circumferentially about pivot joint 90 in a first direction 112. As landing gear 88 rotates circumferentially in the first direction 112, landing gear 88 contacts hook 102 of lock system 100. Hook 102 is positioned such that a radially outward surface 114 of hook 102 is in the path 116 of uplock roller 104. As landing gear 88 rotates circumferentially in first direction 112, uplock roller 104 contacts radially outward (or first) surface 114 of hook 102. In accordance with various embodiments, when landing gear 88 rotates from the landing gear down position to the landing gear up position, lock system 100 is in an unlocked state. As described in further detail below, in the unlocked state, hook 102 of lock system 100 is free, or otherwise allowed, to rotate about a shaft 118 of lock system 100.

In accordance with various embodiments, the contact between uplock roller 104 of landing gear 88 and radially outward surface 114 of hook 102 forces hook 102 away from uplock roller 104. In this regard, the contact between uplock roller 104 and radially outward surface 114 of hook 102 causes hook 102 to rotate circumferentially about shaft 118 in a first direction 120. With momentary reference to FIG. 2A, in various embodiments, radially outward surface 114 of hook 102 may be oriented at an angle relative to a first horizontal plane 115. For example, radially outward surface 114 may be oriented at angle theta (θ) relative to first horizontal plane 115. Angle theta (θ) may be greater than 0° and less than 90°. In various embodiments, angle theta (θ) may be between 10° and 80°, between 15° and 60°, or about 40°, wherein in the previous context only, "about" means±10°. Angle theta (θ) may facilitate translation of hook 102 in first direction 120 in response to contact between uplock roller 104 and radially outward surface 114. First horizontal plane 115 may be coplanar with the radially outward most point 119 of radially outward surface 114 (i.e., the point of radially outward surface 114 that is farthest from shaft 118 and aperture 180). First horizontal plane 115 is parallel to the plane of the axis of rotation of hook 102 (i.e., first horizontal plane 115 is parallel to the XZ plane in the provided XYZ axes).

Figure 2C:
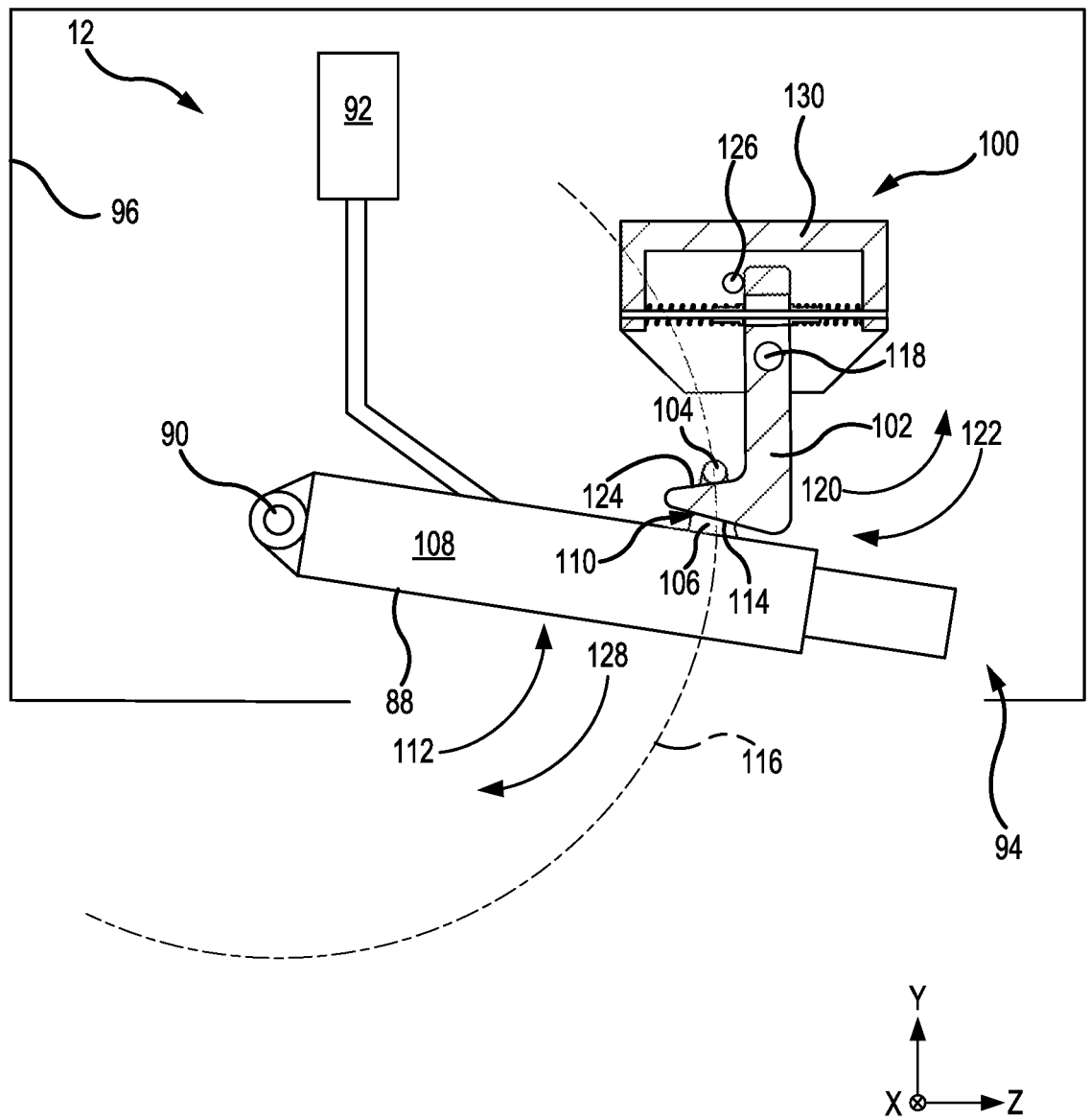
FIG. 2C illustrates a landing gear in the landing gear up position with a landing gear lock system in a locked state, in accordance with various embodiments.
Figure 2D:
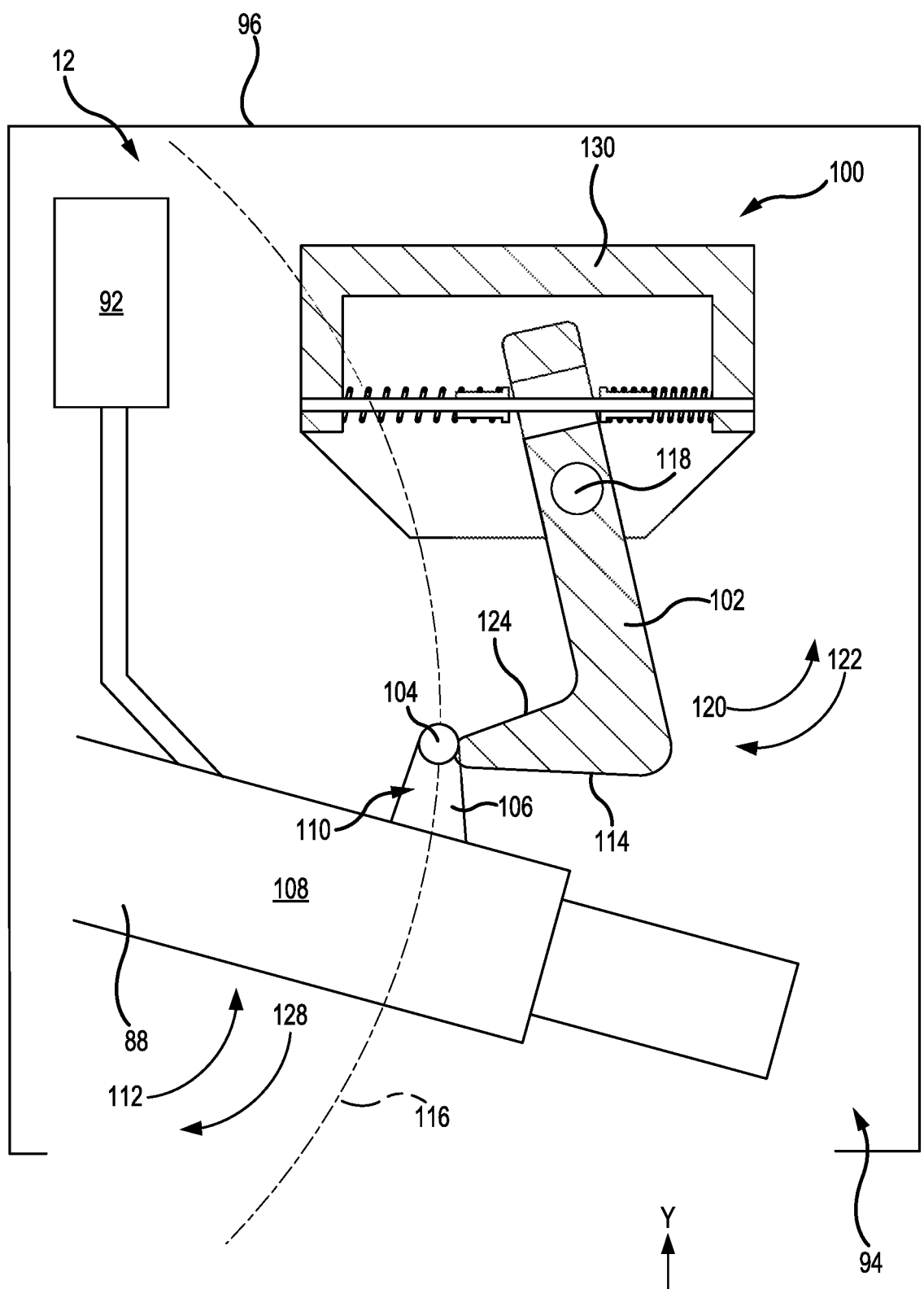
FIG. 2D illustrates a landing gear rotating towards the landing gear down position with a landing gear lock system in an unlocked state, in accordance with various embodiments.

With reference to FIG. 2C, in accordance with various embodiments, hook 102 is biased such that, in response to the interference between hook 102 and uplock roller 104 being removed, hook 102 rotates circumferentially about shaft 118 in a second direction 122. Second direction 122 is opposite first direction 120. In this regard, hook 102 rotates into volume 110, in response to uplock roller 104 being located radially inward of a radially inward (or second) surface 124 of hook 102. Radially inward surface 124 is oriented generally toward the axis of rotation of hook 102. Radially outward surface 114 of hook 102 is oriented generally away from the axis of rotation of hook 102.

In response to hook 102 being located in volume 110 (i.e., located radially outward of uplock roller 104), lock system 100 is translated to the locked state. FIG. 2C illustrates a cross-section view of lock system 100 in the locked state taken along the line 2C-2C in FIG. 4. As described in further detail below, in the locked state, a lock pin 126 of lock system 100 blocks, or otherwise prevents, hook 102 from rotating circumferentially in first direction 120. In response to lock system 100 be placed in the locked state, retract actuator 92 is switch to an off state. In the off state, retract actuator 92 does not support the load of landing gear 88. In this regard, in response to retract actuator 92 being in the off state, gravity forces landing gear 88 to rotate circumferentially about pivot joint 90 in a second direction 128. Second direction 128 is opposite first direction 112. The gravitational forces acting on landing gear 88 cause uplock roller 104 to contact radially inward surface 124 of hook 102. When lock system 100 in the locked state and retract actuator 92 is in the off state, the load of landing gear 88 is transferred through hook 102, shaft 118, and lock pin 126 to a housing 130 of lock system 100. Housing 130 may be coupled to, installed on, or otherwise attached to aircraft structure 96. In this regard, in the landing gear up position with lock system 100 in the locked state and retract actuator 92 in the off state, the load of landing gear 88 may be transferred via housing 130 of lock system 100 to aircraft structure 96.

In accordance with various embodiments, retract actuator 92 may be switched to an on state, in response to receiving a landing gear down command from, for example, the cockpit. The landing gear down command may cause retract actuator 92 to translate landing gear 88 circumferentially in first direction 112, thereby removing the load of landing gear 88 from hook 102. The landing gear down command from the cockpit also causes an unlock command to be sent to lock system 100. The unlock command causes lock system 100 to translate lock pin 126 out the path of hook 102. In response to lock system 100 translating to the unlocked state, retract actuator 92 causes landing gear 88 to rotate circumferentially about pivot joint 90 in second direction 128.

With reference to FIG. 2D, as landing gear 88 rotates circumferentially in second direction 128, uplock roller 104 of landing gear 88 contacts radially inward surface 124 of hook 102. The contact between uplock roller 104 of landing gear 88 and radially inward surface 124 of hook 102 forces hook 102 away from uplock roller 104. In this regard, the contact between uplock roller 104 and radially inward surface 124 causes hook 102 to rotate in a circumferentially about shaft 118 in a first direction 120. Hook 102 rotates circumferentially in first direction 120 until the uplock roller 104 is located radially outward of radially inward surface 124. In response to uplock roller 104 being located radially outward of radially inward surface 124 (i.e., in response to hook 102 be located outside volume 110), landing gear 88 is free to rotate out wheel well 94 and to the landing gear down position shown in FIG. 2A.

With momentary reference to FIG. 2A, in various embodiments, radially inward surface 124 of hook 102 may be oriented at an angle beta (β) relative to a second horizontal plane 117. Angle beta (β) may be greater than 0° and less than 90°. In various embodiments, angle beta (β) may be between 1° and 30°, between 3° and 15°, or about 10°, wherein in the previous context only, "about" means±3°. Angle beta (β) may facilitate translation of hook 102 in first direction 120 in response to contact between uplock roller 104 and radially inward surface 124. Second horizontal plane 117 may be coplanar with the radially inward most point 121 of radially inward surface 124 (i.e., the point of radially inward surface 124 that is closest to shaft 118 and aperture 180). Second horizontal plane 117 is parallel to the plane of the axis of rotation of hook 102 (i.e., second horizontal plane 117 is parallel to the XZ plane in the provided XYZ axes).

In accordance with various embodiments, hook 102 is biased such that, in response to the interference between hook 102 and uplock roller 104 being removed, hook 102 rotates circumferentially about shaft 118 in second direction 122. In this regard, the biasing forces applied to hook 102 are configured to locate, or "re-center", hook 102 in the path 116 of uplock roller 104 such that hook 102 is in position for the next time landing gear 88 is translated to the landing gear up position.

While FIGS. 2A, 2B, 2C, and 2D illustrate lock system 100 engaging landing gear 88 of landing gear assembly 12, it is further contemplated and understood that landing gear assembly 14 and landing gear assembly 16, with momentary reference to FIG. 1, may include landing gears, similar to landing gear 88, which may be secured by a lock system including the elements and functionalities as described herein with respect to lock system 100.

Figure 3A:
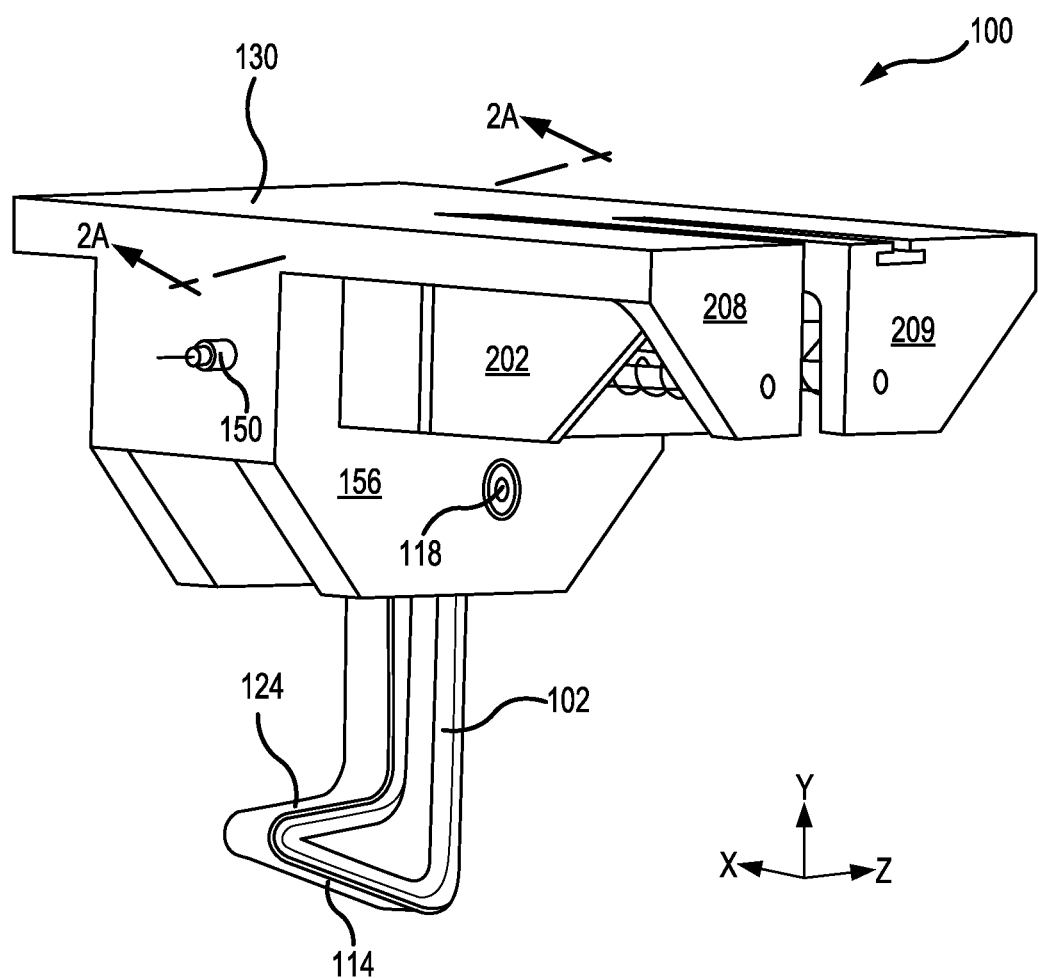
FIGS. 3A and 3B illustrate a landing gear lock system in an unlocked state, in accordance with various embodiments.
Figure 3B:
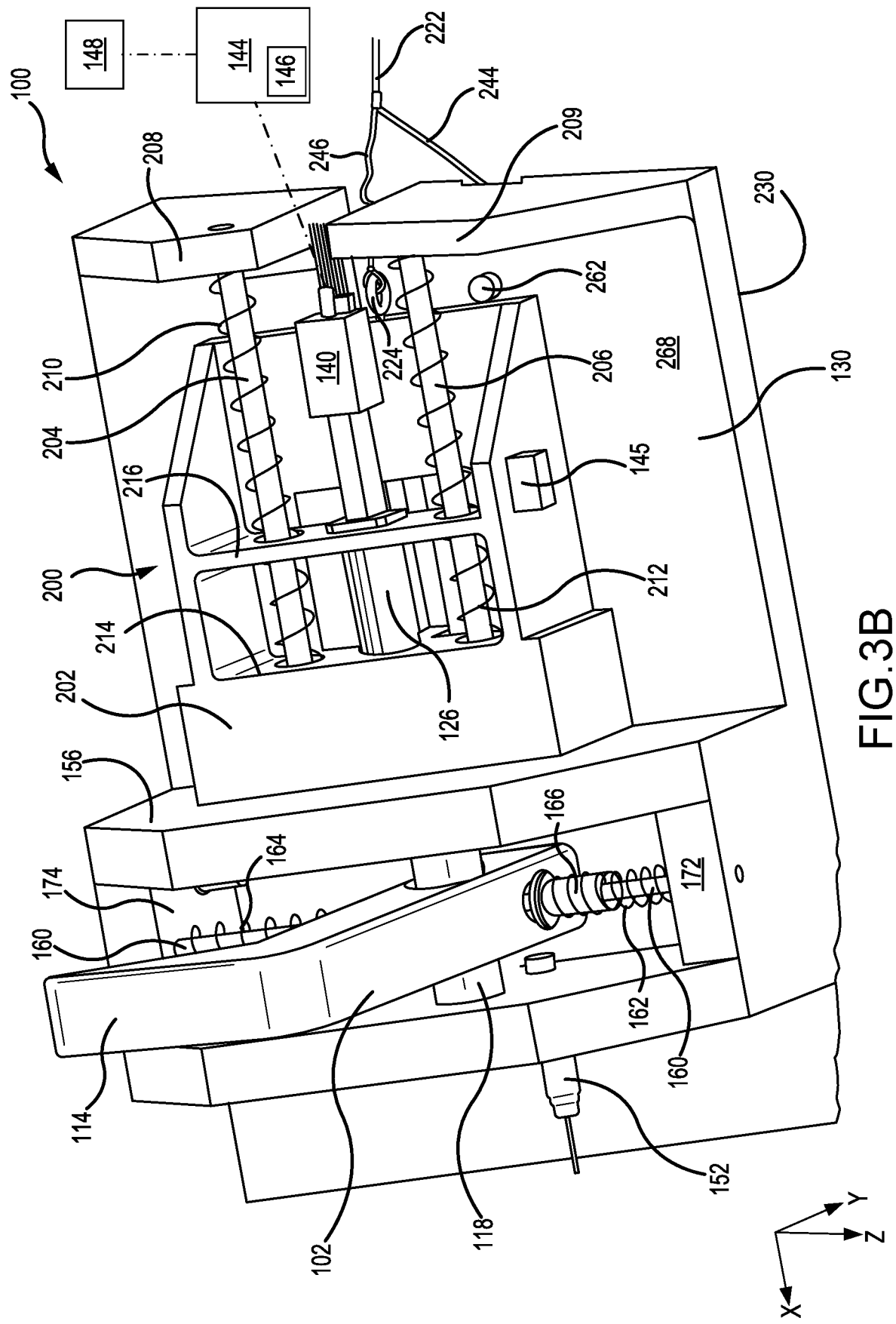

With reference to FIGS. 3A and 3B, a lock system 100 for locking aircraft landing gear in the landing gear up position is illustrated. In accordance with various embodiments, lock system 100 includes housing 130, hook 102, and shaft 118. Shaft 118 may be coupled to housing 130. Hook 102 is configured to rotate about shaft 118 and relative to housing 130.

Figure 12:
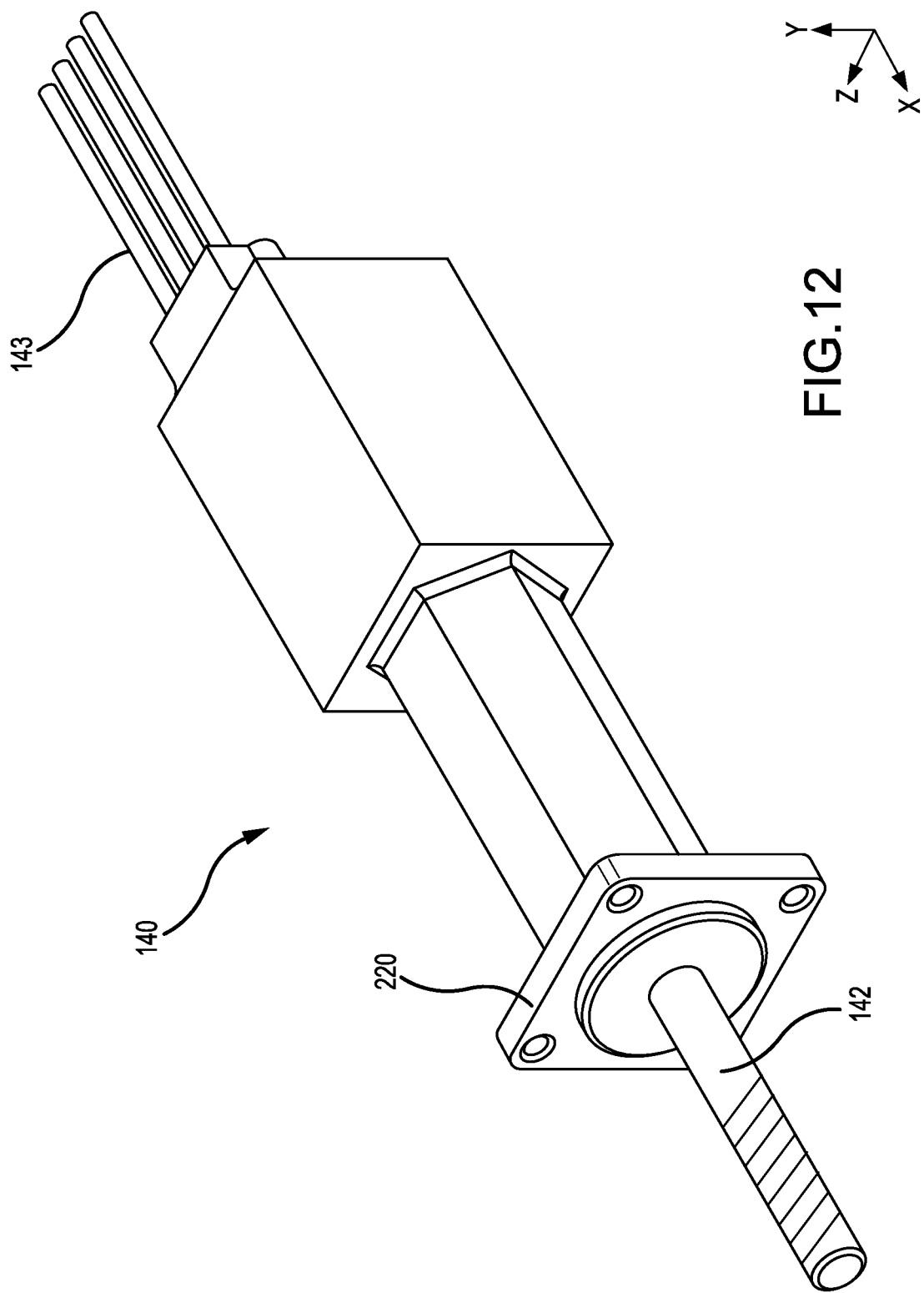
FIG. 12 illustrates a lock actuator for a landing gear lock system, in accordance with various embodiments.

Lock system 100 further includes lock pin 126 and a lock actuator 140. Lock actuator 140 is configured to translate lock pin 126 toward and away from hook 102. Lock actuator 140 may translate lock pin 126 in a linear direction. With additional reference to FIG. 12, in various embodiments, a piston 142 of lock actuator 140 is coupled, for example, via a threaded coupling, a cross bolt, or any other suitable fastening, to lock pin 126. In accordance with various embodiments, lock actuator 140 is an electromechanical actuator. In this regard, lock actuator 140 is configured to translate piston 142, and thus lock pin 126 which is coupled to piston 142, in response to receiving an electrical signal from a controller 144. In various embodiments, power is provided to lock actuator 140 via electrical conduits 143. Electrical conduits 143 may also electrically couple controller 144 and lock actuator 140. In various embodiments, lock actuator 140 may receive power from an aircraft and/or landing gear power supply. In various embodiments, lock system 100 may include a backup battery 145. Backup battery 145 is electrically coupled to lock actuator 140. In various embodiments, backup battery may be electrically coupled to electrical conduits 143. In various embodiments, backup battery 145 may be mounted to a release bracket 202 of lock system 100. In various embodiments, backup battery 145 may comprise, for example, a rechargeable lithium battery. Backup battery 145 may provide to power to lock actuator should lock actuator 140 fail to receive power from its normal power supply (e.g., from the aircraft or landing gear power supply).

With continued reference to FIG. 3B, controller 144 is operationally coupled to and may control actuation of lock pin 126. Controller 144 may comprise a processor and a tangible, non-transitory memory 146. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Controller 144 may be a standalone controller or may be incorporated into an overall control for landing gear 88. Controller 144 may comprise one or more logic modules that implement landing gear logic. Controller 144 may be operationally coupled to a display 148. Display 148 may be located in the cockpit and may convey information regarding the status of lock system 100 to the pilot. For example, display 148 may convey whether lock system 100 is in the locked state or the unlocked state.

With combined reference to FIG. 3A and FIG. 3B, in various embodiments, lock system 100 includes one or more sensors, such as sensor 150 and sensor 152. Sensors 150, 152 are proximity sensors configured to determine a location of lock pin 126 and hook 102. For example, sensors 150, 152 may be inductive, capacitive, magnetic, optical, or any other suitable type of proximity sensor. Sensors 150, 152 may be mounted to housing 130. Sensors 150, 152 are operationally coupled, via wired or wireless connection, to controller 144. Stated differently, sensors 150, 152 may output signals, indicative of the position of lock pin 126 and hook 102, to controller 144. In accordance with various embodiments, controller 144 is configured to determine the state (i.e., locked or unlocked) of lock system 100 and the position of hook 102 (e.g., "centered" or "not centered") based on the signals received from sensors 150, 152. In various embodiments, controller 144 determines the position of lock pin 126 based on signals output from sensor 150, and the position of hook 102 based on signals output from sensor 152.

Controller 144 may control actuation of landing gear 88 in FIGS. 2A, 2B, 2C, and 2D, and/or control action of lock pin 126 based actuation of landing gear 88. In this regard, with combined reference to FIG. 2A and FIG. 3B, in response to receiving a landing gear up command, controller 144 may command retract actuator 92 to retract landing gear 88 into wheel well 94. Upon determining landing gear 88 is in the landing gear up position and hook 102 is in the "centered" position, controller 144 commands lock actuator 140 to actuate lock pin 126 toward hook 102. In response to determining lock system 100 is in the locked state (e.g., based upon output from sensors 150, 152), controller 144 commands display 148 to indicate landing gear 88 is up and locked, thereby indicating that the retract actuator 92 can be switched to the off state. In response to receiving a landing gear down command, retract actuator 92 is switched to the on state and controller 144 commands lock actuator 140 to translate lock pin 126 away from hook 102. In response to determining lock pin 126 is not in the path of hook 102, for example, based on signals received from sensors 150, 152, controller 144 commands display 148 to indicate the landing gear is unlocked. In response to determining lock system 100 is in the unlocked state, retract actuator 92 is commanded to translate landing gear 88 to the landing gear down position. As discussed in further detail below, lock system 100 includes a manual release assembly 200. Manual release assembly 200 is configured to translate lock system 100 to the unlocked stated. For example, if after commanding lock actuator 140 to translate lock pin 126 away from hook 102, sensors 150, 152 indicate lock pin 126 is still in the path of hook 102, display 148 will continuing displaying that the landing gear locked, thus indicating to the pilot that the manual release assembly 200 should be engaged to translate lock system 100 to the unlocked state.

Figure 4:
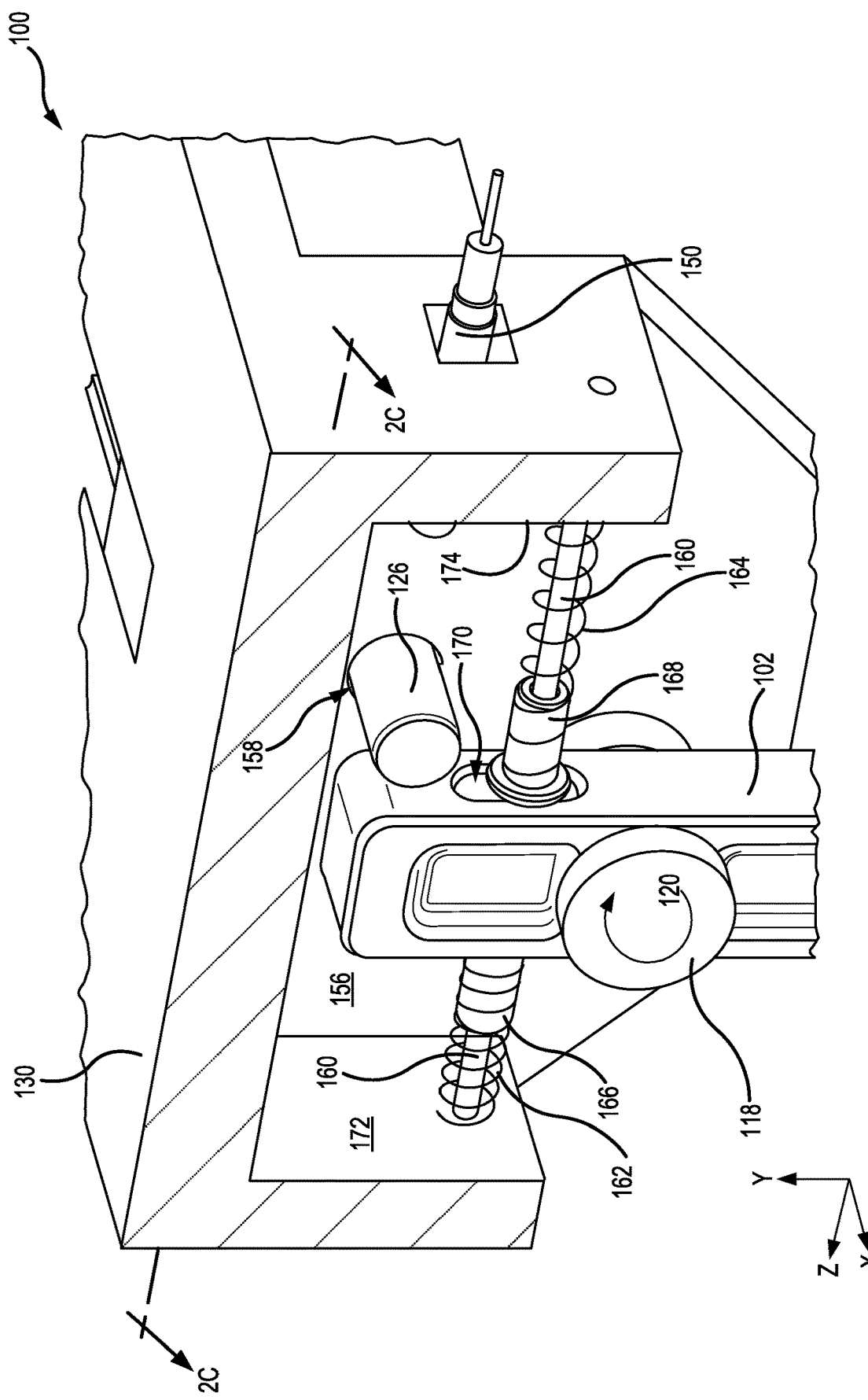
FIG. 4 illustrates a landing gear lock system in a locked state, in accordance with various embodiments.

With reference to FIG. 4, lock system 100 is illustrated in the locked stated. In the locked state, lock pin 126 is positioned to block, or otherwise prevent, rotation of hook 102 circumferentially in first direction 120. Lock pin 126 may extend through a wall 156 of housing 130. Stated differently, wall 156 may define an aperture 158 configured to receive lock pin 126. In accordance with various embodiments, lock system 100 may further include a centering rod 160, hook biasing members 162, 164, and bushings 166, 168. Hook biasing members 162, 164 may comprise compression springs, tension springs, or any other biasing device capable of applying force to hook 102 in opposing directions. Centering rod 160 extends through an aperture 170 defined by hook 102. Centering rod 160 may be mounted to housing 130. In various embodiments, centering rod 160 is perpendicular to shaft 118. Hook biasing members 162, 164 and bushings 166, 168 may be located on or around centering rod 160. In various embodiments, hook biasing member 162 may be a compression spring, which may be compressed between a wall 172 of housing 130 and bushing 166. In various embodiments, hook biasing member 164 may be a compression spring, which may be compressed between a wall 174 of housing 130 and bushing 168. Bushings 166, 168 may be in contact with opposing sides of hook 102. In accordance with various embodiments, hook 102 is biased to a "center" position. In this regard, hook 102 may be biased in opposing directions by hook biasing member 162 and hook biasing member 164. With momentary combined reference to FIG. 4 and FIG. 5, controller 144 may be configured to determine whether hook 102 is in the centered position (i.e., in the path 116 of uplock roller 104 in FIG. 2A) based on the signals output from sensors 150, 152.

Figure 5:
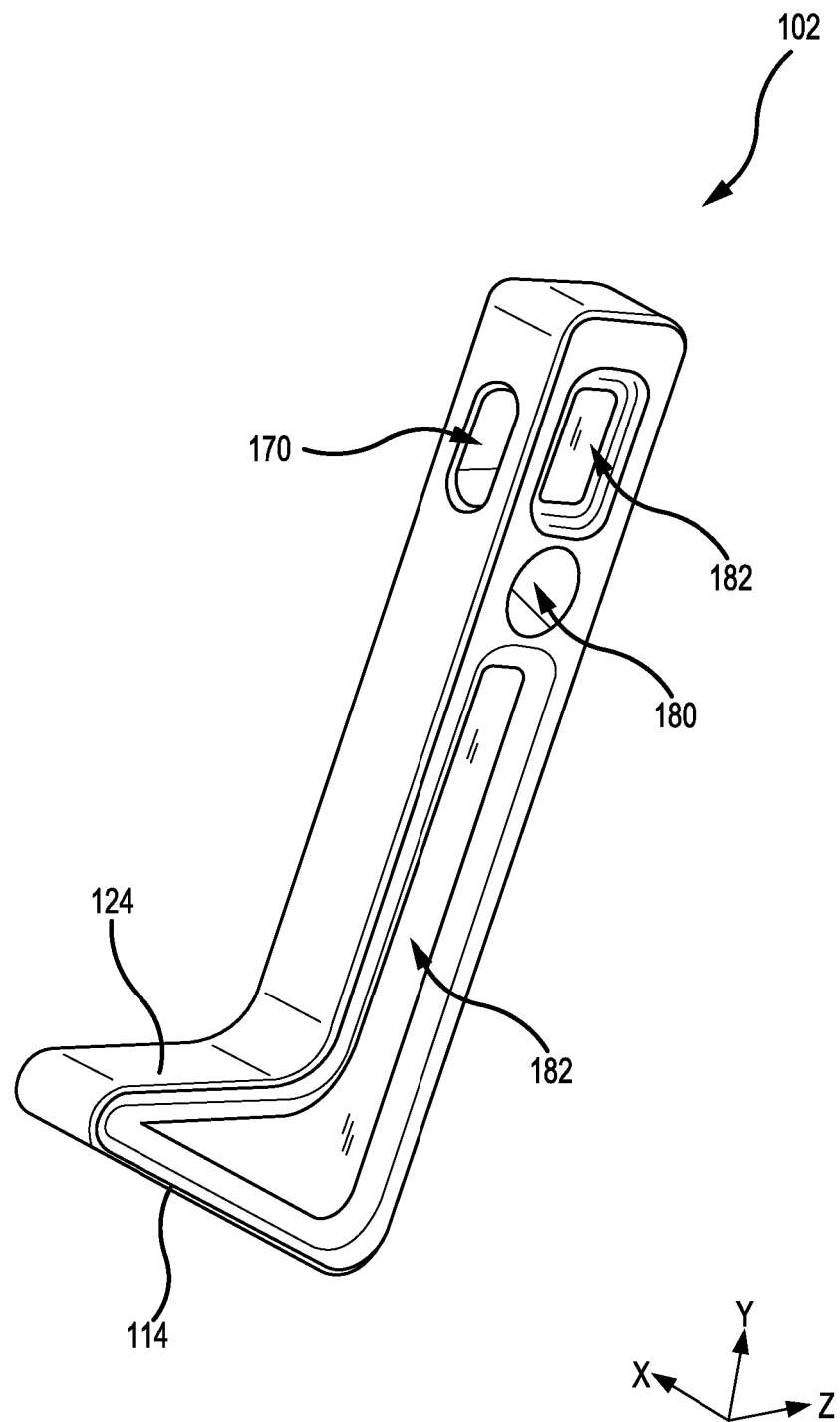
FIG. 5 illustrates a hook for a landing gear lock system, in accordance with various embodiments.

With reference to FIG. 5, hook 102 is illustrated. In accordance with various embodiments, hook 102 defines aperture 170 and an aperture 180. Aperture 170 is configured to receive centering rod 160 (FIG. 4). Aperture 170 has an elliptical or oval shape. For example, aperture 170 may be defined by two parallel walls, which are connected by two rounded, or curved, walls. The shape of aperture 170 allows hook 102 to pivot, or swing, relative to centering rod 160, in response to rotation of hook 102 about shaft 118 (FIG. 2B). Aperture 180 is configured to receive shaft 118 (FIG. 2B). Aperture 180 has generally circular shape. In various embodiments, one or more grooves 182 may be formed in hook 102. Grooves 182 may decrease a weight of hook 102. Apertures 170, 180 are formed completely through hook 102. Grooves 182 are formed only partially through hook 102.

Returning to FIG. 3B, in accordance with various embodiments, lock system 100 includes a manual release assembly 200. Manual release assembly 200 is configured to allow lock system 100 to be manually translated to the non-locked state from the cockpit by, for example, the pilot. Manual release assembly 200 includes a release bracket 202. Release bracket 202 is configured to translate relative to housing 130. Release bracket 202 may be slidably coupled to support shafts 204, 206. Support shafts 204, 206 are coupled to housing 130. For example, support shaft 204 may be mounted between wall 156 and a wall 208 of housing 130. Support shaft 206 may be mounted between wall 156 and a wall 209 of housing 130.

Manual release assembly 200 further includes one or more bracket biasing member(s), for example, bracket biasing member 210 and bracket biasing member 212, configured to bias release bracket 202 toward wall 156. In various embodiments, bracket biasing member 210 may be located around support shaft 204. In various embodiments, bracket biasing member 212 may be located around support shaft 206. Bracket biasing members 210, 212 may comprise compression springs, tension springs, or any other biasing device capable of applying forcing release bracket 202 toward wall 156. In various embodiments, bracket biasing member 210 may be a compression spring, which may be compressed between a wall 214 of release bracket 202 and wall 208 of housing 130. In various embodiments, bracket biasing member 212 may be a compression spring, which may be compressed between wall 214 of release bracket 202 and wall 209 of housing 130. In various embodiments, release bracket 202 includes a bulkhead 216. Bulkhead 216 may be located between wall 214 of release bracket 202 and lock actuator 140. In accordance with various embodiments, lock actuator 140 (and thus lock pin 126) is coupled to release bracket 202. For example, with reference to FIG. 6 and FIG. 12, a coupling bracket 220 may attach lock actuator 140 to bulkhead 216. Piston 142 of lock actuator 140 may translate linearly relative to bulkhead 216 and coupling bracket 220.

Figure 6:
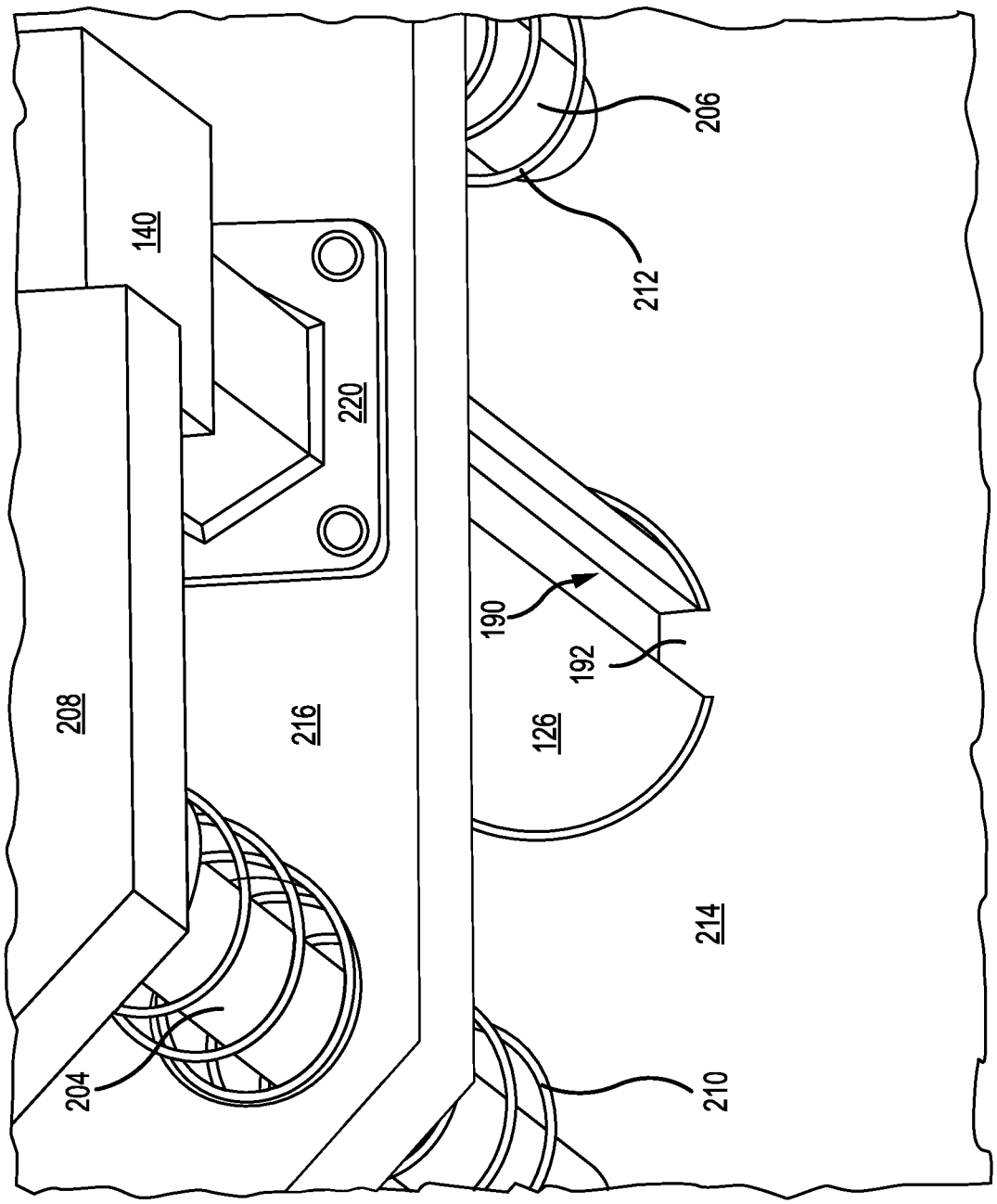
FIG. 6 illustrates a lock pin of a landing gear lock system, in accordance with various embodiments.

With continued reference to FIG. 6, in accordance with various embodiments, lock pin 126 may define a pin groove 190. Pin groove 190 is configured to receive a protrusion 192 defined by wall 214 of release bracket. Locating protrusion 192 in pin groove 190 may reduce or prevent rotation of lock pin 126. In various embodiments, wall 156 of housing 130, with momentary reference to FIG. 4 may define a protrusion, similar to protrusion 192, configured to be located within pin groove 190.

Figure 7A:
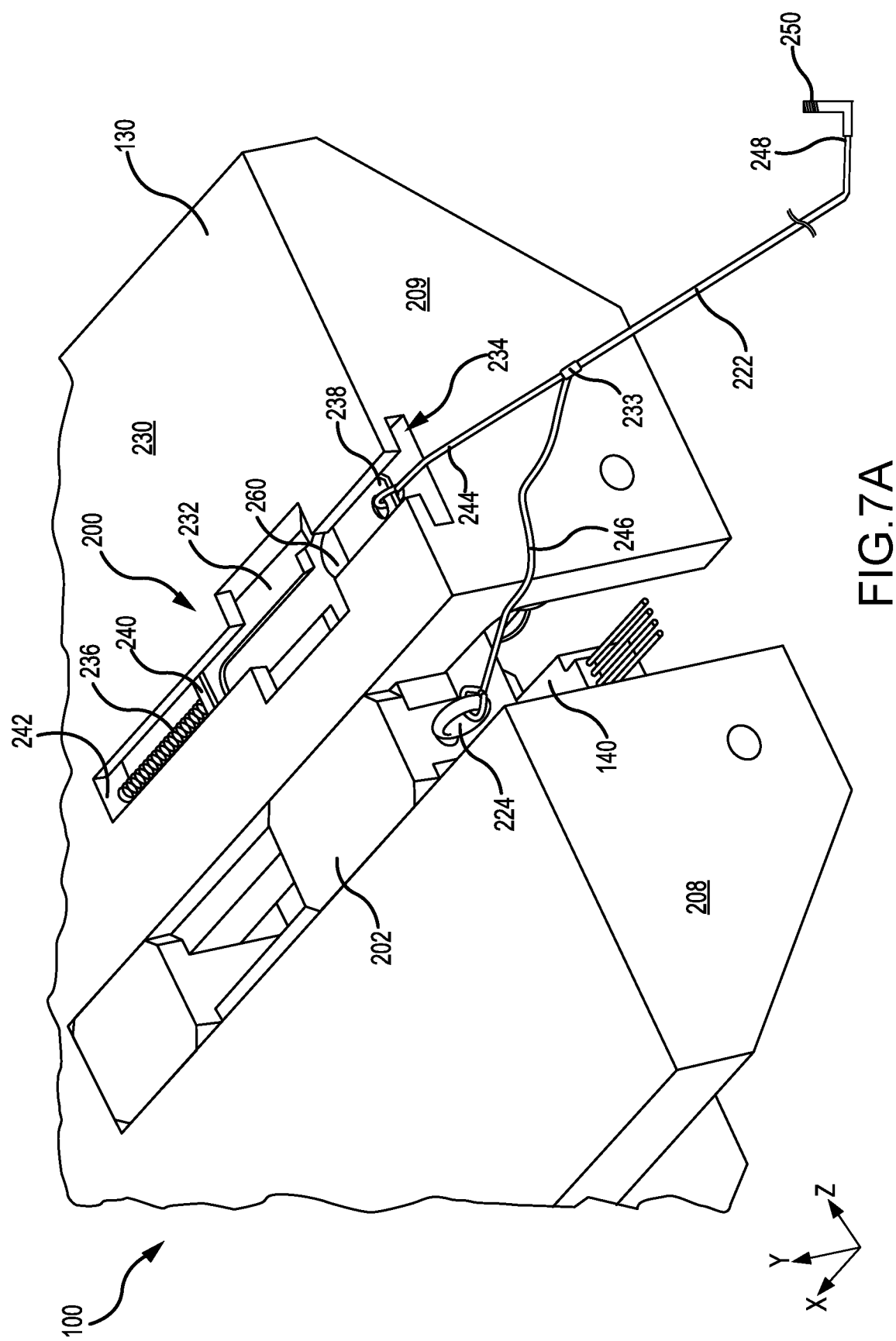
FIGS. 7A, 7B, and 7C illustrate a manual release assembly of a landing gear lock system, in accordance with various embodiments.

Returning to FIG. 3B, manual release assembly 200 further includes a cord 222. Cord 222 is coupled to release bracket 202. In various embodiments, cord 222 is coupled to release bracket 202 via a loop or eye end 224 attached to release bracket 202. Referring now to FIG. 7A, and with continued reference to FIG. 3B, an underside surface 230 of housing 130 is illustrated. In accordance with various embodiments, manual release assembly 200 further includes a pop-up strip 232. Pop-up strip 232 is located in a channel 234 defined by housing 130. Cord 222 is coupled to pop-up strip 232. In various embodiments, manual release assembly 200 includes a strip biasing member 236 configured to bias pop-up strip 232 away from cord 222 and toward a surface 242 of housing 130. Strip biasing member 236 may comprise a compression spring, tension spring, or any other biasing device capable of forcing pop-up strip 232 away from cord 222 and toward a surface 242 of housing 130.

Figure 9:
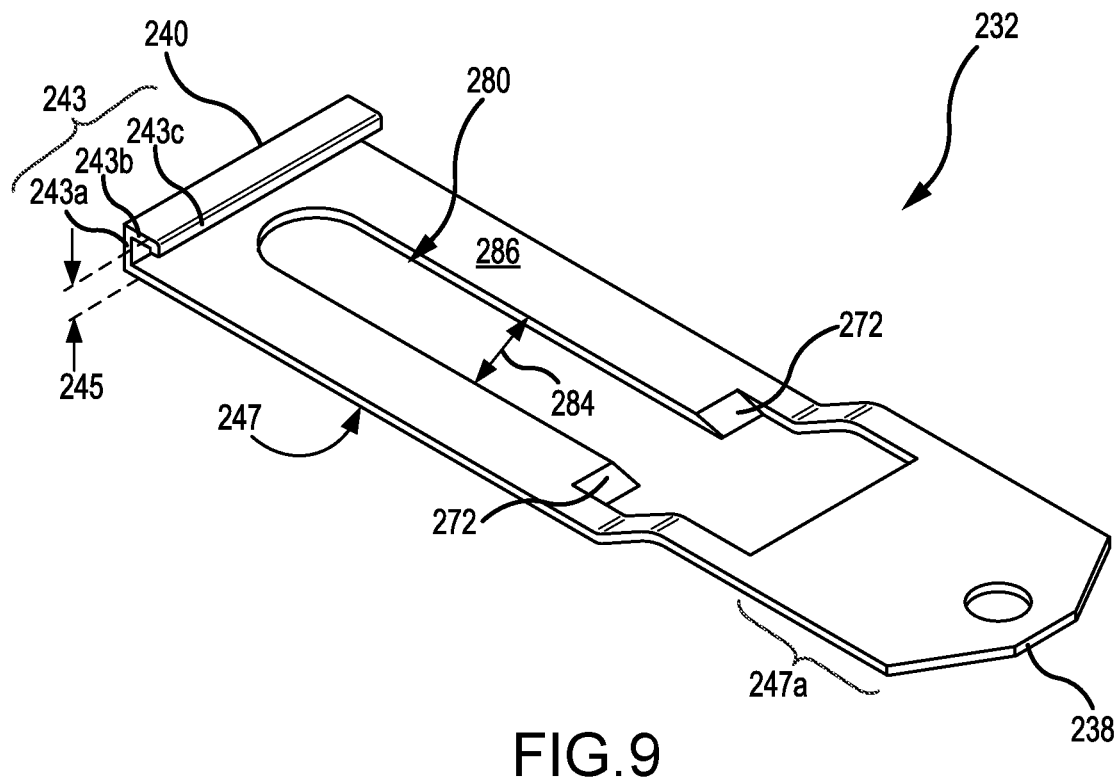
FIG. 9 illustrates a pop-up strip of a manual release assembly of a landing gear lock system, in accordance with various embodiments.

With additional reference to FIG. 9, cord 222 may be attached to a first end 238 of pop-up strip 232 and strip biasing member 236 may be attached to a second end 240 of pop-up strip 232 that is opposite first end 238. In various embodiments, strip biasing member 236 may be a tension spring, which may be coupled between second end 240 of pop-up strip 232 and housing 130.

Figure 11A:
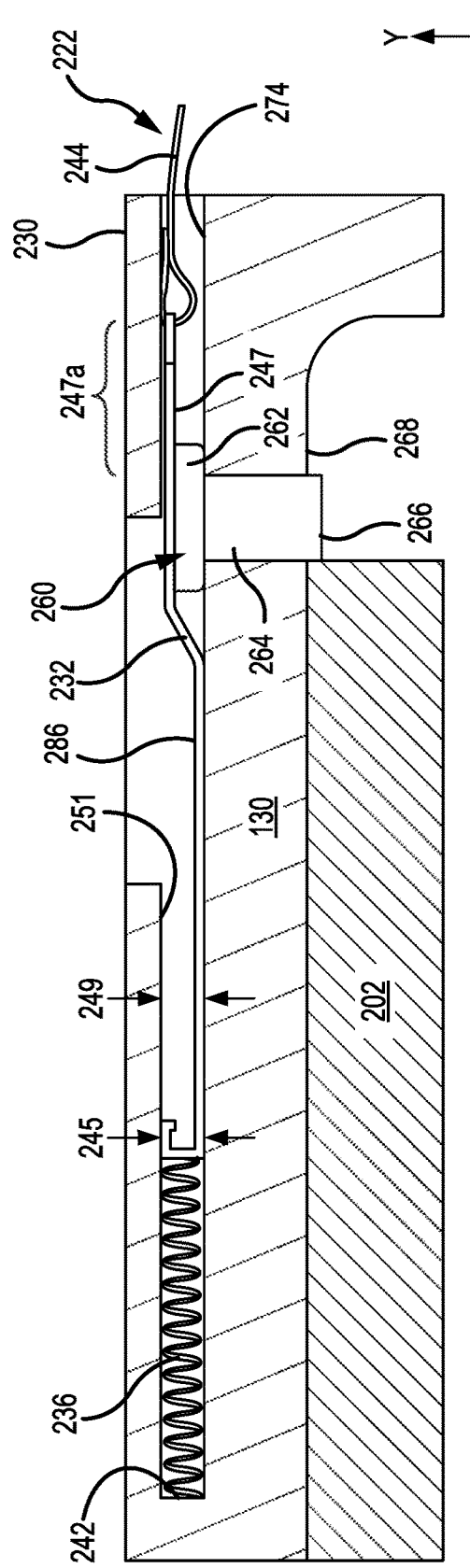
FIG. 11A illustrates a pop-up pin of a manual release assembly in the down position, in accordance with various embodiments.

In various embodiments, second end 240 of pop-up strip 232 may include a flange 243. Flange 243 may include a first vertical portion 243a and a horizontal portion 243b. First vertical portion 243a may extending away from a surface 286 of pop-up strip 232. Horizontal portion 243b may extend from first vertical portion 243a away from surface 242 of housing 130. In various embodiments, first vertical portion 243a may be normal to surface 286, and horizontal portion 243b may be normal to first vertical portion 243a. In various embodiments, flange 243 may include a second vertical portion 243c. Second vertical portion 243c may extend from horizontal portion 243b towards surface 286. Second vertical portion 243c may be normal to horizontal portion 243b and/or parallel to first vertical portion 243a. Flange 243 may facilitate translation of pop-up strip 232 within channel 234. For example, a height 245 of pop-up strip 232 may be approximately equal to a height 249 of channel 234, with momentary reference to FIG. 11A. Height 245 is measured between horizontal portion 243b and surface 247 of pop-up strip 232 at second end 240 of pop-up strip 232. With reference to FIG. 11A, height 249 is measured between a surface 251 and a surface 274 of housing 130. Surface 251 and surface 274 may, at least partially, define channel 234. Height 245 and height 249 being approximately equal tends to prevent or reduce pivoting of pop-up strip 232 within channel 234

Returning to FIG. 7A, cord 222 is configured to translate pop-up strip 232 and release bracket 202. In various embodiments, a first portion 244 of cord 222 is connected to pop-up strip 232 and a second portion 246 of cord 222 is connected to release bracket 202. First portion 244 and second portion 246 may be connected to one another at a connection point 233. First portion 244 extends from connection point 233 to pop-up strip 232. Second portion 246 extends from connection point 233 to release bracket 202.

An end 248 of cord 222 is operatively coupled to a lever 250. End 248 is opposite connection point 233 and first and second portions 244, 246. Lever 250 may be located in the cockpit. Actuation of lever 250 translates, or "pulls," cord 222, thereby causing cord 222 to translate pop-up strip 232 and release bracket 202. In various embodiments, cord 222 is configured to translate of pop-up strip 232 prior to release bracket 202. In various embodiments, a difference between the length of first portion 244 and the distance between connection point 233 and pop-up strip 232 is less than the difference between the length of second portion 246 and the distance between connection point 233 and release bracket 202. Stated differently, there may be more "slack" in second portion 246 as compared to first portion 244. In various embodiments, a length of first portion 244 may be less than a length of second portion 246. As discussed in further detail below, translating pop-up strip 232 prior to release bracket 202, allows pop-up strip 232 to remove a pop-up pin 260 from the path of release bracket 202.

Figure 7B:
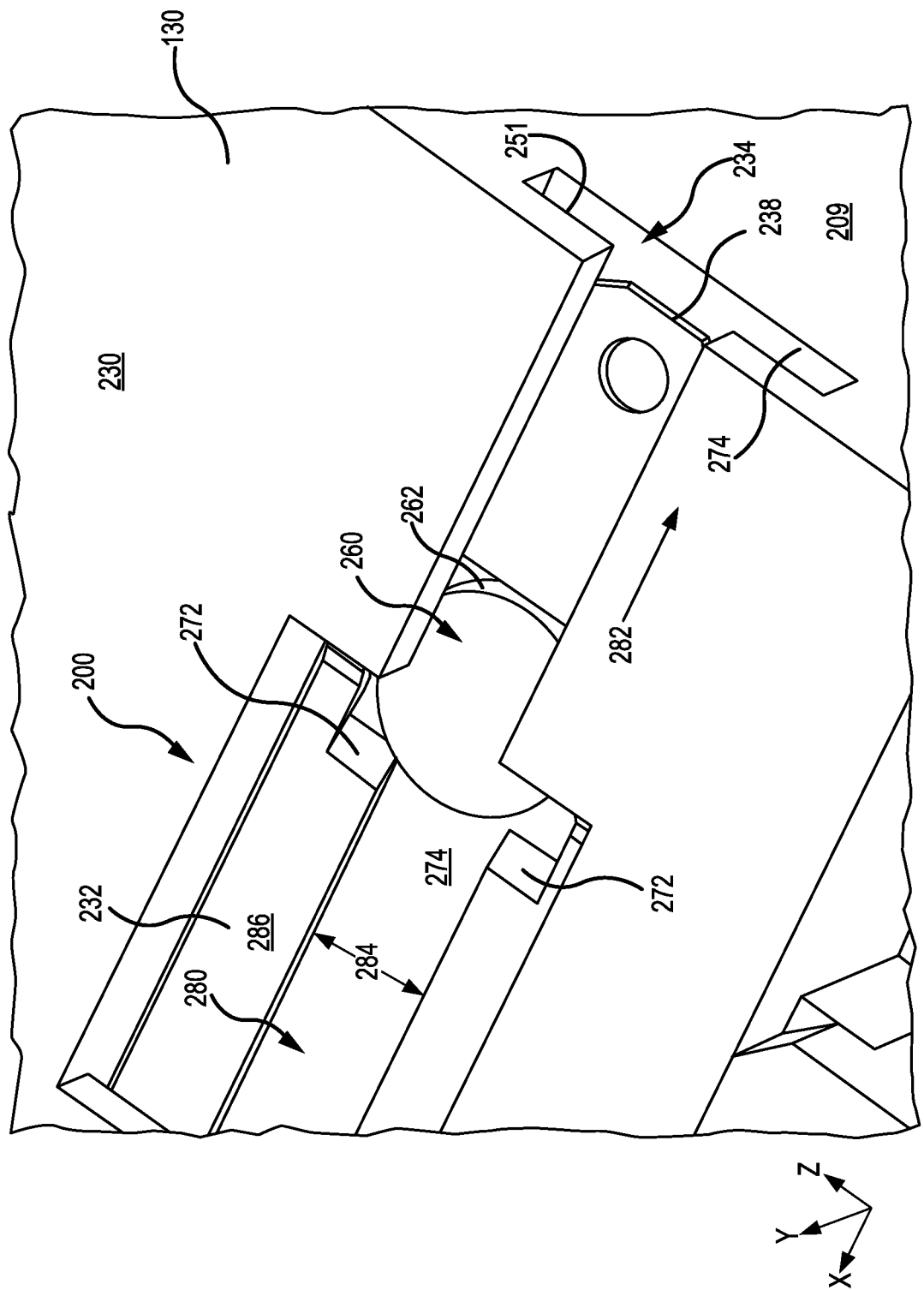
Figure 7C:
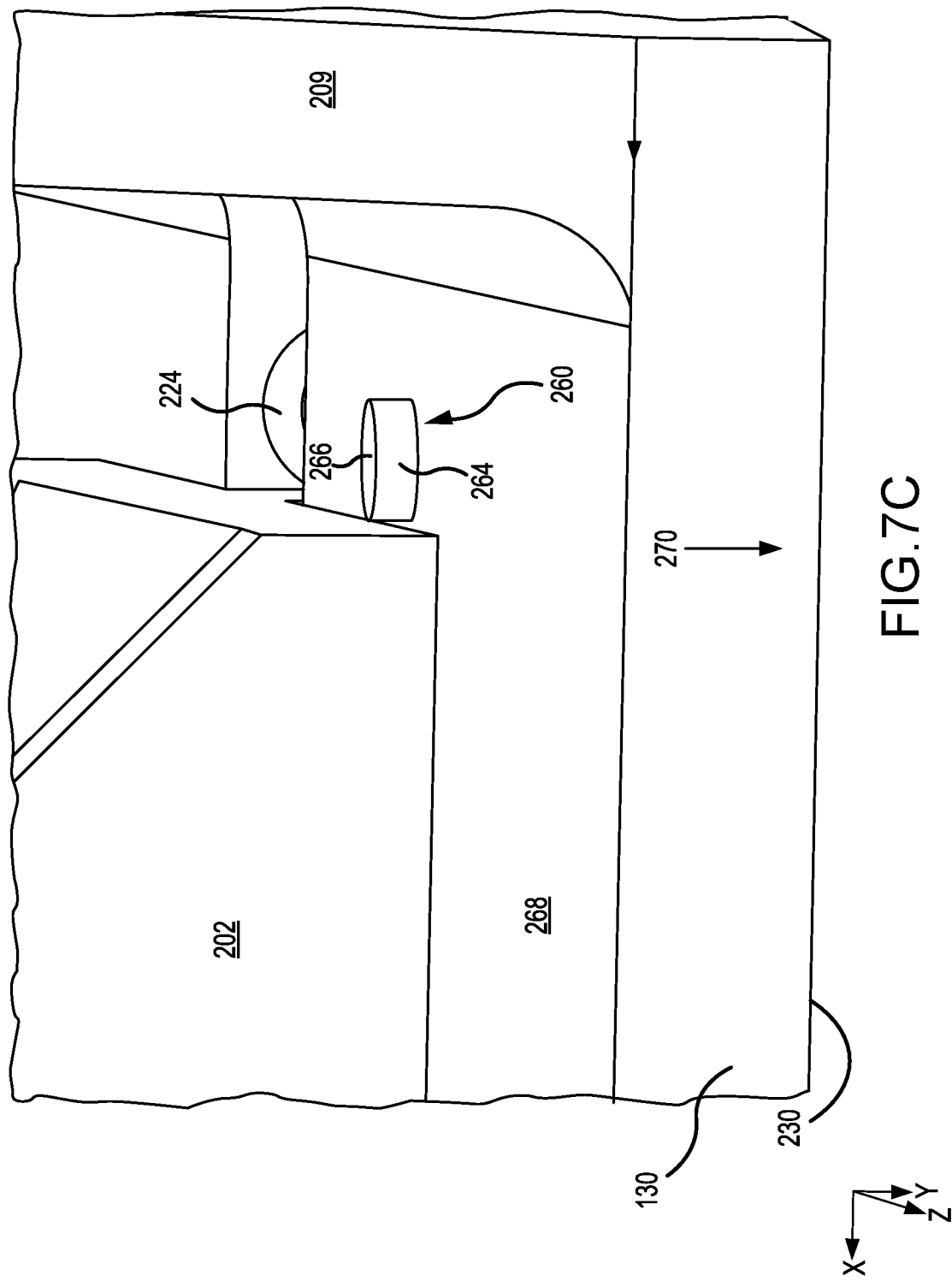
Figure 10:
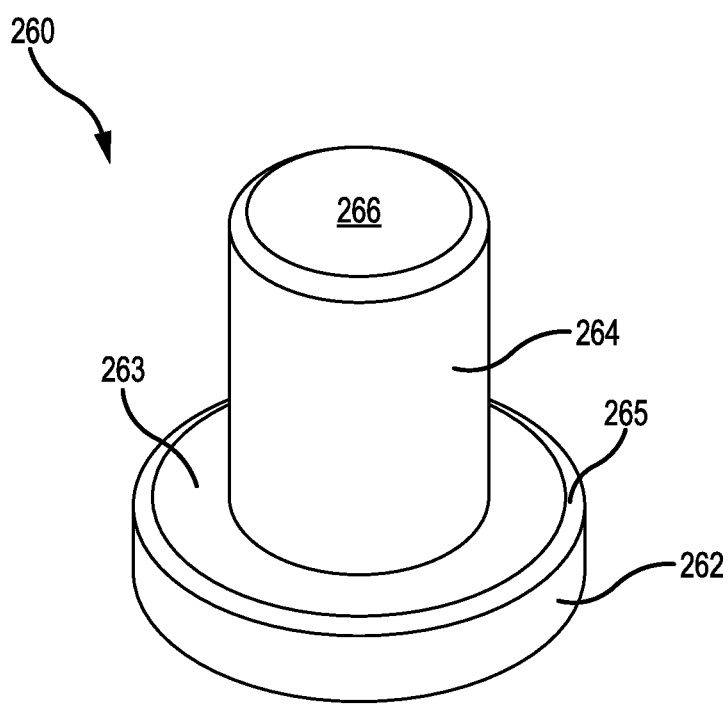
FIG. 10 illustrates a pop-up pin of a manual release assembly of a landing gear lock system, in accordance with various embodiments.

Referring to FIGS. 7B and 7C, translation of pop-up strip 232 is configured to translate a pop-up pin 260 of manual release assembly 200. In FIG. 7B, cord 222 has been removed for clarity. With additional reference to FIG. 10, pop-up pin 260 includes a head 262 and a pin shaft 264. Pin shaft 264 extends from a surface 263 of head 262. In various embodiments, head 262 may include a chamfered edge 265. Prior to actuation of lever 250 in FIG. 7A, an end 266 of pin shaft 264 protrudes from a surface 268 of housing 130. Surface 268 is opposite surface 230. End 266 of pop-up pin 260 protruding from surface 268 blocks or prevents translation of release bracket 202.

Figure 11B:
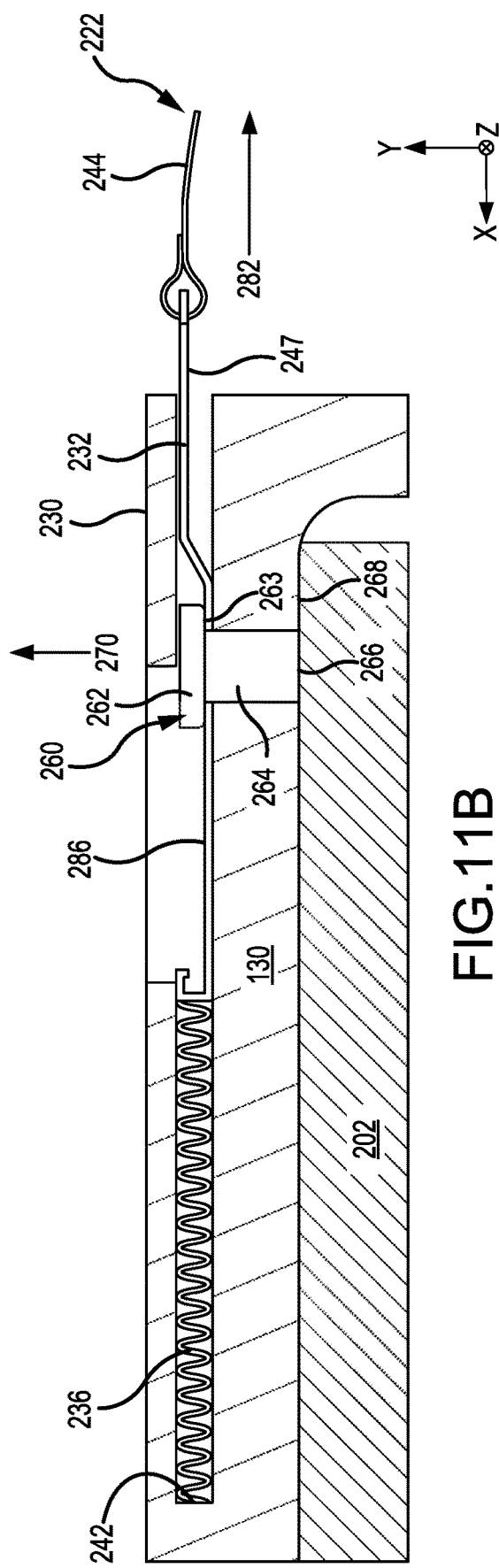
FIG. 11B illustrates a pop-up pin of a manual release assembly in the up position, in accordance with various embodiments.

With additional reference to FIG. 11A and FIG. 11B, pop-up strip 232 is configured to translate pop-up pin 260 in a first direction extending from surface 268 to surface 230 (i.e., in the direction of arrow 270). Pop-up strip 232 includes an entry chamfer formed by slanted surfaces 272. Slanted surfaces 272 are configured to translate between surface 274 of housing 130 and surface 263 of head 262 of pop-up pin 260. Chamfered edge 265 of head 262 may facilitate head 262 sliding over slanted surfaces 272 of pop-up strip 232. Surface 274 is oriented toward surface 232 and surface 251 of housing 130, and away from surface 268 of housing 130. In various embodiments, surface 274 may be parallel to surface 230 and surface 251. Pop-up strip 232 defines a pin channel 280. Pin channel 280 is configured to receive pin shaft 264 in response to cord 222 translating pop-up strip 232 in the direction of arrow 282. A width 284 of pin channel 280 is less than the diameter of head 262 of pop-up pin 260 and greater than the diameter of pin shaft 264 of pop-up pin 260. Pop-up strip 232 is configured such that locating head 262 of pop-up pin 260 over surface 286 of pop-up strip 232 translates pin shaft 264 into housing 130. In this regard, locating surface 286 of pop-up strip 232 between surface 263 of head 262 and surface 274 of housing 130 translates end 266 of pin shaft 264 into housing 130 (i.e., locates end 266 of pin shaft 264 between surface 268 and surface 274).

Pop-up strip 232 is configured to translate pop-up pin 260 between an up position FIG. 11B and a down position FIG. 11A. In the down position, end 266 of pin shaft 264 protrudes from surface 268 of housing 130 and restricts the movement of release bracket 202. During normal operation, pop-up pin 260 may be in the down position, thereby locking, or preventing translation of, release bracket 202 during normal operation.

In the up position, end 266 of pin shaft 264 is located within housing 130, such that pin shaft 264 is removed from the path of release bracket 202. Pop-up pin 260 is translated to the up position by pop-up strip 232. For example, in response to slanted surfaces 272 of pop-up strip 232 translating towards pop-up pin, slanted surfaces 272 contact chamfered edge 265 and head 262 slides over slanted surfaces 272 and then over surface 286 of pop-up pin 232, which causes pop-up pin 260 to translate in the direction of arrow 270. In this regard, the thickness of pop-up strip 232, as measured between surface 286 and surface 247, is selected to remove shaft 264 from the path of release bracket 202, thereby allowing second portion 246 of cord 222 to translate release bracket 202 in the direction of arrow 282. Translation of release bracket 202 in the direction of arrow 282 (i.e., away from wall 156 and hook 102) translates lock pin 126 in the direction of arrow 282, thereby removing lock pin 126 from the rotational path of hook 102.

Thus, should lock actuator 140 fail to retract lock pin 126 and free hook 102 for rotation about shaft 118, pop-up strip 232 may be translated by cord 222 in response to manual actuation of lever 250, resulting in linear movement of pop-up strip 232 towards pop-up pin 260, thereby removing pin shaft 264 from the path of release bracket 202 prior to cord 222 translating release bracket 202.

Figure 8:
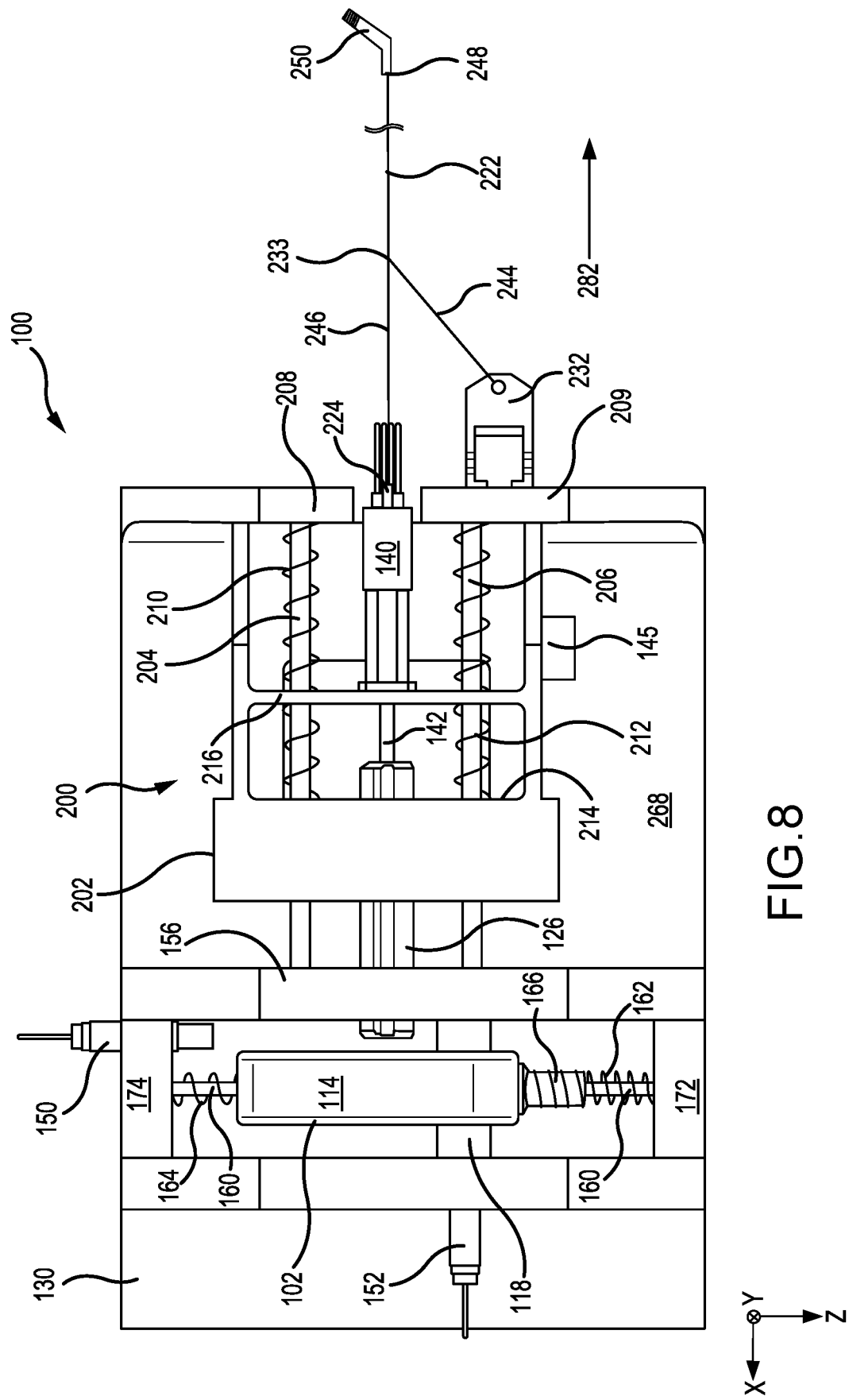
FIG. 8 illustrates a landing gear lock system in an unlocked state, in accordance with various embodiments.

FIG. 8 illustrates manual release assembly 200 of lock system 100 after actuation of lever 250. With combined reference to FIG. 7A and FIG. 8, in accordance with various embodiments, actuation of lever 250 translates pop-up strip 232 and release bracket 202 away from hook 102 (i.e., in the direction of arrow 282). Translation of release bracket 202 translates lock actuator 140 and lock pin 126, which is coupled to piston 142 of lock actuator 140, away from hook 102. (i.e., in the direction of arrow 282). Translation of release bracket 202, in response to translation of cord 222, is configured remove lock pin 126 from the path of hook 102, such that hook 102 can rotate about shaft 118. In this regard, actuation of lever 250 translates lock system 100 to the unlocked stated.

In accordance with various embodiments, manual release assembly 200 is configured to automatically re-set. In this regard, translation of lever 250 to its original position creates slack in cord 222, such that the biasing force of bracket biasing members 210, 212 and strip biasing member 236 is greater than the force applied by cord 222. The biasing force applied by bracket biasing members 210, 212 to release bracket 202 translates release bracket 202, and thus lock actuator 140, toward wall 156 and hook 102. The biasing force applied by strip biasing member 236 to pop-up strip 232 translates pop-up strip 232 toward surface 242 and back to its initial position. With combined reference to FIGS. 7A, 7B, and 7C, translation of pop-up strip 232 toward surface 242 of housing 130 removes surface 286 of pop-up strip 232 from under head 262 of pop-up pin 260, thereby causing head 262 to translate toward surface 274 and causing end 266 of pin shaft 264 to extend from surface 268 of housing 130. In various embodiments, a portion 247a of surface 247 of pop-up strip 232 proximate first end 238 of pop-up strip 232 forces head 262 of pop-up pin 260 toward surface 274 of housing 130. In the down position, the portion 247a of surface 247 of pop-up strip 232 may be located between head 262 and surface 251 of housing 130. Translation of pop-up strip 232 toward surface 242 of housing 130 causes pin shaft 264 of pop-up pin 260 to protrude from surface 268 of housing 130, thereby blocking movement of release bracket 202. Thus, manual release assembly 200 is configured to automatically re-set such that manual release assembly 200 will be in its initial position (FIG. 11A) the next time the landing gear is translated to the landing gear up position.

Lock system 100, including electromechanical lock actuator 140, may be lighter lock systems employing hydraulic actuators. Further, eliminating hydraulic actuator from the lock system reduces the possibility of hydraulic fluid leaks and may decrease noise levels, during locking and unlocking. Sensors 150, 152 in combination with controller 144 and display 148 allow pilots to quickly and easily determine the state (i.e., locked or unlocked) of the landing gear.

With reference to FIGS. 13A and 13B, a hook 302 for a landing gear lock system is illustrated. With combined reference to FIG. 13A, FIG. 13B, and FIG. 2A, in various embodiments, hook 302 may replace hook 102 in lock system 100. Hook 302 includes a radially outward surface 314 and a radially inward surface 324, which are similar to radially outward surface 114 and radially inward surface 324, respectively, of hook 102. Hook 302 defines an aperture 380 configured to receive shaft 118. Hook 302 also defines an aperture configured to receive centering rod 160, similar to aperture 170 of hook 102 in FIG. 4. In various embodiments, one or more grooves 382 may be formed in hook 302. Grooves 382 may decrease a weight of hook 302. Aperture 380 is formed completely through hook 302. Grooves 382 may be formed only partially through hook 302.

Radially outward surface 314 of hook 302 may be oriented at an angle theta (θ) relative to a first horizontal plane 315. Angle theta (θ) may be greater than 0° and less than 90°. In various embodiments, angle theta (θ) may be between 10° and 80°, between 15° and 60°, or about 40°, wherein in the previous context only, "about" means±10°. Angle theta (θ) may facilitate translation of hook 302 in first direction 120 (FIG. 2B) in response to contact between uplock roller 104 and radially outward surface 314. First horizontal plane 315 may be coplanar with the radially outward most point 318 of radially outward surface 314 (i.e., the point of radially outward surface 314 that is farthest from shaft 118 and aperture 380). First horizontal plane 315 is parallel to the plane of the axis of rotation R of hook 302 (i.e., first horizontal plane 315 is parallel to the XZ plane in the provided XYZ axes).

Radially inward surface 324 of hook 302 may be oriented at an angle beta (β) relative to a second horizontal plane 317. Angle beta (β) may be greater than 0° and less than 90°. In various embodiments, angle beta (β) may be between 1° and 30°, between 3° and 15°, or about 10°, wherein in the previous context only, "about" means±3°. Angle beta (β) may facilitate translation of hook 302 in first direction 120 (FIG. 2D) in response to contact between uplock roller 104 and radially inward surface 324. Second horizontal plane 317 may be coplanar with the radially inward most point 320 of radially inward surface 324 (i.e., the point of radially inward surface 324 that is closest to shaft 118 and aperture 380). Second horizontal plane 317 is parallel to the plane of the axis of rotation R of hook 302 (i.e., second horizontal plane 317 is parallel to the XZ plane in the provided XYZ axes).

Hook 302 includes a relief surface 322 extending from radially outward most point 318 of radially outward surface 314 and generally away from a tip 326 of hook 302. Tip 326 may be where radially inward surface 324 and radially outward surface 314 meet. In various embodiments, relief surface 322 may be coplanar with first horizontal plane 315, as shown in FIG. 13A. In various embodiments, relief surface 322 may be oriented at an angle alpha (α) relative to first horizontal plane 315 that is greater than 0°, as shown in FIG. 13B. For example, angle alpha (α) of relief surface 322 relative to first horizontal plane 315 may be 0° to 45°, 5° to 30°, or about 15°, wherein in the previous context only, "about" means±5°. Increasing angle alpha (α) of relief surface 322 may decrease a weight of hook 302.

Relief surface 322 may decease a radial length L1 of hook 302 measured between radially outward most point 318 of radially outward surface 314 and radially inward most point 320 of radially inward surface 324. Decreasing radial length L1 may reduce a weight of hook 302. Decreasing the radial length L1 of hook 302 may also allow for shorter lugs 106 (FIG. 2A), as a distance between uplock roller 104 and strut cylinder 108 may be decreased. Shorter lugs 106 tend to reduce an overall weight of landing gear 88.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lock system for a landing gear assembly, comprising:
    a housing;
    a hook configured to rotate relative to the housing;
    a lock pin configured to translate into a rotational path of the hook;
    an electromechanical actuator configured to translate the lock pin;
    a centering rod located through the hook and configured to connect the hook to the housing;
    a first hook biasing member located around the centering rod and configured to bias the hook in a first direction; and
    a second hook biasing member, separate from the first hook biasing member, located around the centering rod and configured to bias the hook in a second direction opposite the first direction.

2. The lock system of claim 1, wherein a radially outward surface of the hook is oriented at a first angle greater than 0° and less than 90° relative to a first horizontal plane, the first horizontal plane being coplanar with a radially outward most point of the radially outward surface of the hook and parallel to an axis of rotation of the hook, and wherein a radially inward surface of the hook is oriented at a second angle greater than 0° and less than 90° relative to a second horizontal plane, the second horizontal plane being coplanar with a radially inward most point of the radially inward surface of the hook and parallel to the axis of rotation of the hook.

3. The lock system of claim 2, wherein the hook further comprises a relief surface extending from the radially outward most point of the radially outward surface of the hook, and wherein the relief surface is oriented at an angle of 0° to 45° relative to the first horizontal plane.

4. The lock system of claim 2, further comprising a manual release assembly configured to translate the lock pin away from the hook, the manual release assembly comprising:
a release bracket configured to slide relative to the housing; and
a bracket biasing member configured to bias the release bracket toward the hook.

5. The lock system of claim 4, wherein the manual release assembly further comprises:
a pop-up pin including a head and a pin shaft extending from the head, wherein the head is located over a first surface of the housing and an end of the pin shaft extends from a second surface of the housing opposite the first surface;
a pop-up strip located over the first surface;
a cord coupled to a first end of the pop-up strip and configured to translate a slanted surface of the pop-up strip toward the pop-up pin; and
a strip biasing member configured to bias a second end of the pop-up strip away from the pop-up pin.

6. The lock system of claim 5, wherein a first portion of the cord is coupled to the pop-up strip and a second portion of the cord is coupled to the release bracket, and wherein the first portion and the second portion are connected at a connection point, and wherein a first difference between a first length of first portion and a first distance between the connection point and the first end of the pop-up strip is less than a second difference between a second length of second portion and a second distance between the connection point and the release bracket.

7. The lock system of claim 1, further comprising a proximity sensor configured to detect a position of the lock pin.

8. A landing gear assembly, comprising:
a landing gear configured to rotate about a pivot joint; and
a lock system configured to engage the landing gear, the lock system comprising:
a housing;
a hook configured to rotate relative to the housing;
a lock pin configured to translate into a rotational path of the hook;
an electromechanical actuator configured to translate the lock pin;
a centering rod located through the hook and configured to connect the hook to the housing;
a first hook biasing member configured to bias the hook in a first direction; and
a second hook biasing member, separate from the first hook biasing member, configured to bias the hook in a second direction opposite the first direction.

9. The landing gear assembly of claim 8, wherein the lock system further comprises:
a first proximity sensor configured to detect a position of the lock pin;
a second proximity sensor configured to detect a position of the hook; and
a controller configured to determine the position of the lock pin based a first signal output from the first proximity sensor and the position of the hook based on a second signal output from the second proximity sensor.

10. The landing gear assembly of claim 8, wherein the lock system further comprises a manual release assembly configured to translate the lock pin away from the hook.

11. The landing gear assembly of claim 10, wherein the manual release assembly comprises:
a release bracket configured to translate relative to the housing; and
a bracket biasing member configured to bias the release bracket toward the hook.

12. The landing gear assembly of claim 11, wherein the manual release assembly further comprises:
a pop-up pin including a head and a pin shaft extending from the head, wherein the head is located over a first surface of the housing and an end of the pin shaft extends from a second surface of the housing opposite the first surface;
a pop-up strip located over the first surface;
a cord coupled to a first end of the pop-up strip and configured to translate a slanted surface of the pop-up strip toward the pop-up pin; and
a strip biasing member configured to bias a second end of the pop-up strip away from the pop-up pin.

13. The landing gear assembly of claim 12, wherein a first portion of the cord is coupled to the pop-up strip and a second portion of the cord is coupled to the release bracket.

14. The landing gear assembly of claim 13, wherein the cord is configured to translate the pop-up pin prior to translating the release bracket.

15. A lock system, comprising:
a housing;
a hook configured to rotate relative to the housing;
a lock pin configured to translate into a rotational path of the hook;
an actuator configured to translate the lock pin;
a manual release assembly configured to translate the lock pin away from the hook;
a centering rod located through the hook and configured to connect the hook to the housing;
a first hook biasing member configured to bias the hook in a first direction; and
a second hook biasing member, separate from the first hook biasing member, configured to bias the hook in a second direction opposite the first direction.

16. The lock system of claim 15, wherein the manual release assembly comprises:
a release bracket configured to slide relative to the housing;
a bracket biasing member configured to bias the release bracket toward the hook;
a pop-up pin including a head and a pin shaft extending from the head, wherein the head is located over a first surface of the housing and an end of the pin shaft extends from a second surface of the housing opposite the first surface;
a pop-up strip located over the first surface;
a cord coupled to a first end of the pop-up strip and configured to translate a slanted surface of the pop-ip strip toward the pop-up pin; and
a strip biasing member configured to bias a second end of the pop-up strip away from the pop-up pin.

17. The lock system of claim 15, further comprising
a first sensor configured to detect a position of the lock pin;

a second sensor configured to detect a position of the hook; and a controller configured to determine the position of the lock pin based a first signal output from the first sensor and the position of the hook based on a second signal output from the second sensor.

\* \* \* \* \*